United States Patent
Ishibashi et al.

(10) Patent No.: US 10,798,269 B2
(45) Date of Patent: *Oct. 6, 2020

(54) SYSTEM COMPRISING A SERVER FOR PROVIDING A SERVICE TO AN IMAGE FORMING APPARATUS, AND AUTHENTICATION THEREOF

(71) Applicant: BROTHER KOGYO KABUSHIKI KAISHA, Nagoya, Aichi (JP)

(72) Inventors: Masayuki Ishibashi, Aichi (JP); Tatsuhiko Sone, Aichi (JP); Ken Saito, Tokoname (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,844

(22) Filed: Feb. 26, 2019

(65) Prior Publication Data
US 2019/0268499 A1    Aug. 29, 2019

Related U.S. Application Data

(63) Continuation of application No. 15/718,263, filed on Sep. 28, 2017, now Pat. No. 10,257,389, which is a
(Continued)

(30) Foreign Application Priority Data

Feb. 27, 2015 (JP) .................................. 2015-038035

(51) Int. Cl.
*H04N 1/44* (2006.01)
*H04N 1/327* (2006.01)
(Continued)

(52) U.S. Cl.
CPC ....... *H04N 1/4433* (2013.01); *H04N 1/00244* (2013.01); *H04N 1/00973* (2013.01);
(Continued)

(58) Field of Classification Search
CPC ............. H04N 1/00482; H04N 1/4433; H04N 1/00973; H04N 1/00244; H04N 1/32747;
(Continued)

(56) References Cited

U.S. PATENT DOCUMENTS

| | | |
|---|---|---|
| 2003/0117642 A1 | 6/2003 | Haraguchi |
| 2004/0190038 A1 | 9/2004 | Shahindoust |

(Continued)

FOREIGN PATENT DOCUMENTS

| | | |
|---|---|---|
| JP | 2004-295888 A | 10/2004 |
| JP | 2013-522774 A | 6/2013 |
| JP | 2015-11532 A | 1/2015 |

OTHER PUBLICATIONS

English Abstract of WO 2011115987 A2, dated Sep. 22, 2011.
(Continued)

*Primary Examiner* — Eric A. Rust
(74) *Attorney, Agent, or Firm* — Scully, Scott, Murphy & Presser, PC

(57) ABSTRACT

A communication system including an image processing apparatus configured to, in response to receiving acquisition instruction information from a server via indirect communication, receive authentication information from an information processing terminal device via near-field wireless communication, transmit the received authentication information to the server via the indirect communication, and in response to receiving communication instruction information, which indicates a method for data communication with a service providing apparatus, from the server via the indirect communication, perform data communication with (Continued)

the service providing apparatus in accordance with the received communication instruction information.

20 Claims, 13 Drawing Sheets

Related U.S. Application Data continuation of application No. 15/051,738, filed on Feb. 24, 2016, now Pat. No. 9,813,590.

(51) Int. Cl.
| | |
|---|---|
| *H04W 4/00* | (2018.01) |
| *H04W 12/04* | (2009.01) |
| *H04W 12/06* | (2009.01) |
| *H04W 8/22* | (2009.01) |
| *H04N 1/00* | (2006.01) |
| *H04W 4/80* | (2018.01) |
| *H04L 29/06* | (2006.01) |

(52) U.S. Cl.
CPC .......... *H04N 1/32747* (2013.01); *H04W 4/80* (2018.02); *H04W 8/22* (2013.01); *H04W 12/04031* (2019.01); *H04W 12/06* (2013.01); *H04L 63/18* (2013.01); *H04N 2201/006* (2013.01); *H04N 2201/0094* (2013.01); *H04W 12/04* (2013.01)

(58) Field of Classification Search
CPC . H04N 2201/006; H04W 12/06; H04W 4/008
See application file for complete search history.

(56) References Cited

U.S. PATENT DOCUMENTS

| | | |
|---|---|---|
| 2011/0235085 A1 | 9/2011 | Jazayeri et al. |
| 2011/0299110 A1 | 12/2011 | Jazayeri et al. |
| 2012/0057193 A1 | 3/2012 | Jazayeri et al. |
| 2014/0320919 A1 | 10/2014 | Kowaka |
| 2015/0002884 A1 | 1/2015 | Okumura et al. |
| 2016/0055477 A1 | 2/2016 | Guerin et al. |
| 2016/0124689 A1 | 5/2016 | Nishino |

OTHER PUBLICATIONS

Office Action dated Jan. 23, 2017 from related U.S. Appl. No. 15/051,738.
Office Action dated May 8, 2017 from related U.S. Appl. No. 15/051,738.
Notice of Allowance dated Jul. 6, 2017 from related U.S. Appl. No. 15/051,738.
Notification of Reasons for Rejection dated Jun. 26, 2018 received from the Japanese Patent Office in related JP 2015-038035 together with English language translation.
Office Action dated Jul. 11, 2018 from parent application U.S. Appl. No. 15/718,263.
Notice of Allowance dated Nov. 20, 2018 from parent U.S. Appl. No. 15/718,263.

| R-TOKEN | PIN |
|---------|------|
| 0x51D | 2473 |
| 0x24A | 2387 |
| 0x3DB | 5521 |
| ⋮ | ⋮ |

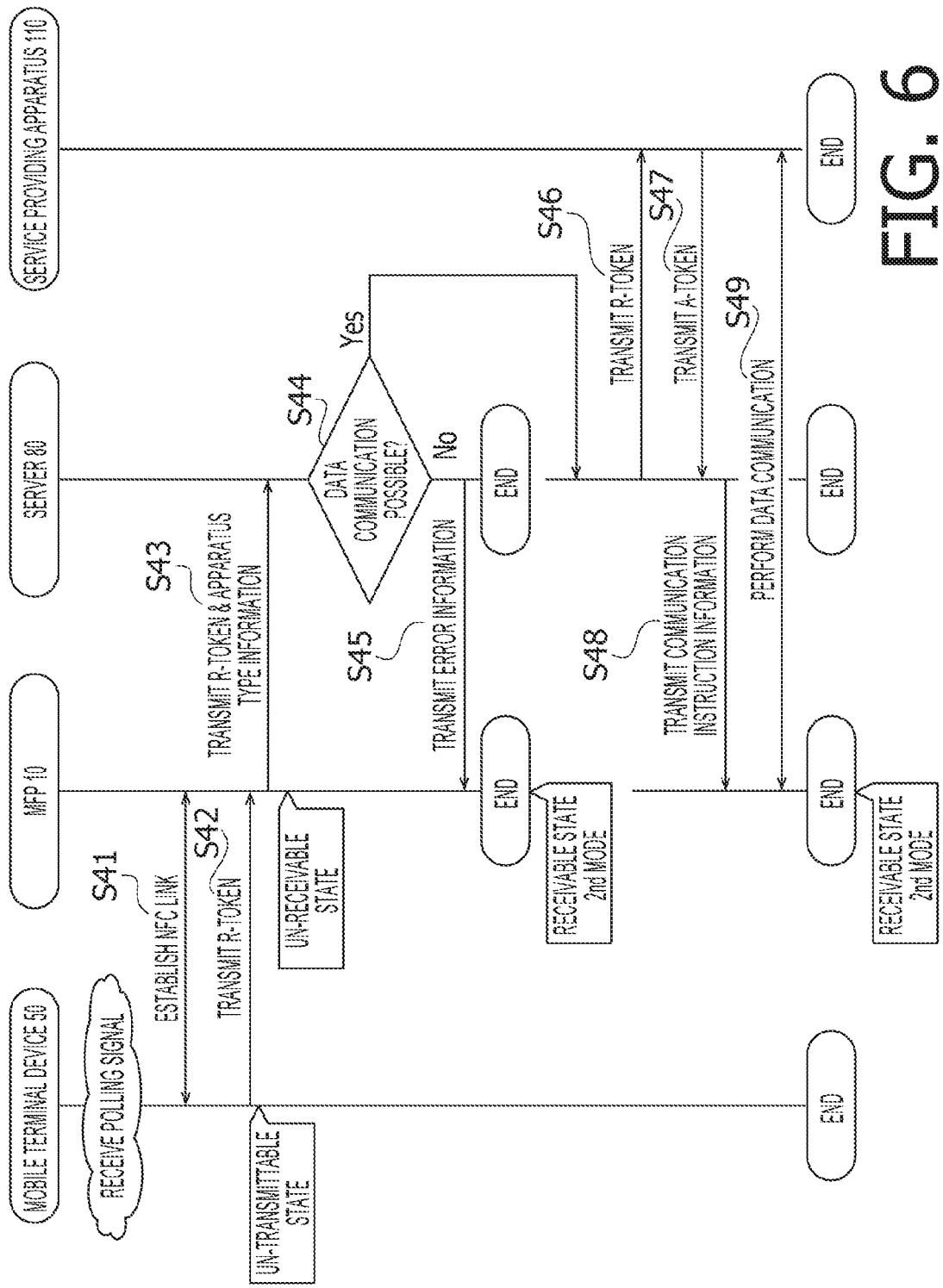

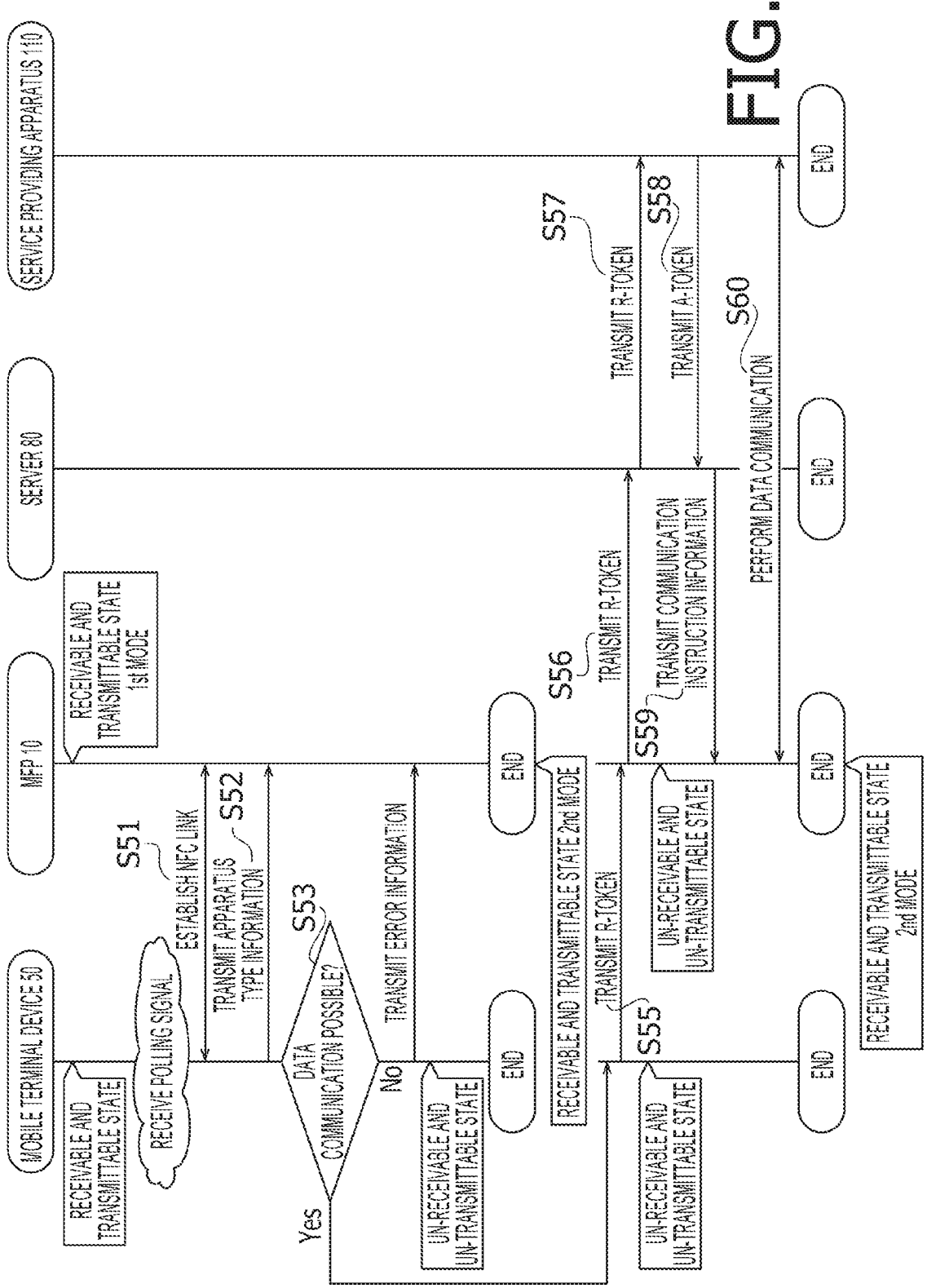

SYSTEM COMPRISING A SERVER FOR PROVIDING A SERVICE TO AN IMAGE FORMING APPARATUS, AND AUTHENTICATION THEREOF

CROSS-REFERENCE TO RELATED APPLICATION

This application is a continuation of U.S. Ser. No. 15/718,263 filed on Sep. 28, 2017, which is a continuation of U.S. Ser. No. 15/051,738, filed Feb. 24, 2016, now U.S. Pat. No. 9,813,590 granted on Nov. 7, 2017, which claims priority under 35 U.S.C. § 119 from Japanese Patent Application No. 2015-038035 filed on Feb. 27, 2015. The entire subject matter of the each of which is incorporated herein by reference.

BACKGROUND

Technical Field

The following description relates to one or more aspects of a communication system configured to perform data communication between an image processing apparatus and a service providing apparatus.

Related Art

A communication system has been known in which when a user registers an image processing apparatus on a service providing apparatus via a personal computer (hereinafter referred to as a "PC"), authentication information is transmitted from the service providing apparatus to the PC. Further, in the communication system, when the user inputs the authentication information into the image processing apparatus, data communication becomes available between the image processing apparatus and the service providing apparatus.

SUMMARY

Nonetheless, according to the known communication system, the user is requested to perform an operation of registering the image processing apparatus on the service providing apparatus and an operation of inputting the authentication information displayed on a display of the PC into the image processing apparatus. Namely, there is a problem that the user needs to perform troublesome operations to start data communication between the image processing apparatus and the service providing apparatus.

Aspects of the present disclosure are advantageous to provide one or more improved techniques, for a communication system, which make it possible to simplify user operations to start data communication between an image processing apparatus and a service providing apparatus.

According to aspects of the present disclosure, a communication system is provided that is configured to perform data communication with a service providing apparatus on an Internet, the communication system including an image processing apparatus, a server on the Internet, and an information processing terminal device. The information processing terminal device includes a terminal-side storage, a first network interface, a user interface, and a first controller configured to accept, via the user interface, an input of an instruction to perform a preparation process to connect the image processing apparatus with the service providing apparatus, in response to accepting the input of the instruction to perform the preparation process via the user interface, transmit transmission request information to the server via the first network interface, the transmission request information being for requesting the server to transmit authentication information, the authentication information representing authorization to perform data communication with the service providing apparatus, receive the authentication information from the server via the first network interface, store the received authentication information into the terminal-side storage, and transmit the authentication information stored in the terminal-side storage, to the image processing apparatus via the first network interface. The image processing apparatus includes an image processor, a second network interface, an operation interface, and a second controller configured to accept, via the operation interface, an input of an instruction to perform data communication with the service providing apparatus, in response to accepting the input of the instruction to perform data communication with the service providing apparatus, transmit communication request information to the server via the second network interface, the communication request information being for requesting the server to perform data communication with the service providing apparatus, receive acquisition instruction information from the server via the second network interface, the acquisition instruction information being for instructing the image processing apparatus to receive the authentication information, in response to receiving the acquisition instruction information from the server via the second network interface, set the second network interface into a receivable state where the second network interface is allowed to receive the authentication information from the information processing terminal device, receive the authentication information from the information processing terminal device via the second network interface, transmit the received authentication information to the server via the second network interface, receive communication instruction information from the server via the second network interface, the communication instruction information indicating a method for the data communication with the service providing apparatus, and in response to receiving the communication instruction information from the server via the second network interface, perform data communication with the service providing apparatus via the second network interface in accordance with the received communication instruction information. The server includes a third network interface configured to communicate with an external device via the Internet, and a third controller configured to, in response to receiving the transmission request information from the information processing terminal device via the third network interface, transmit the authentication information to the information processing terminal device via the third network interface, in response to receiving the communication request information from the image processing apparatus via the third network interface, transmit the acquisition instruction information to the image processing apparatus via the third network interface, and in response to receiving the authentication information from the image processing apparatus via the third network interface, transmit the communication instruction information to the image processing apparatus via the third network interface.

According to aspects of the present disclosure, further provided is an image processing apparatus including an image processor, a communication interface configured to communicate with an external device via an Internet, a near-field communication interface configured to perform near-field wireless communication with an external device, using a near-field wireless communication protocol, an operation interface, and a controller configured to accept, via the operation interface, an input of an instruction to perform data communication with a service providing apparatus on the Internet, in response to accepting the input of the instruction to perform data communication with the service providing apparatus, transmit communication request information to a server via the communication interface, the communication request information being for requesting the server to perform data communication with the service providing apparatus, receive acquisition instruction information from the server via the communication interface, the acquisition instruction information being for instructing the image processing apparatus to receive authentication information, the authentication information representing authorization to perform data communication with the service providing apparatus, in response to receiving the acquisition instruction information from the server via the communication interface, set the near-field communication interface into a receivable state where the near-field communication interface is allowed to receive the authentication information from an information processing terminal device, receive the authentication information from the information processing terminal device via the near-field communication interface, transmit the received authentication information to the server via the communication interface, receive communication instruction information from the server via the communication interface, the communication instruction information indicating a method for the data communication with the service providing apparatus, and in response to receiving the communication instruction information from the server via the communication interface, perform data communication with the service providing apparatus via the communication interface in accordance with the received communication instruction information.

According to aspects of the present disclosure, further provided is a server including a communication interface configured to communicate with an image processing apparatus, an information processing terminal device, and a service providing apparatus via an Internet, the image processing apparatus being configured to perform data communication with the service providing apparatus using authentication information, the authentication information representing authorization to perform data communication with the service providing apparatus, and a controller configured to receive transmission request information from the information processing terminal device via the communication interface, the transmission request information being for requesting the server to transmit the authentication information, in response to receiving the transmission request information from the information processing terminal device, transmit the authentication information to the information processing terminal device via the communication interface, receive communication request information from the image processing apparatus via the communication interface, the communication request information being for requesting the server to perform data communication with the service providing apparatus, in response to receiving the communication request information from the image processing apparatus via the communication interface, transmit acquisition instruction information to the image processing apparatus via the communication interface, the acquisition instruction information being for instructing the image processing apparatus to receive the authentication information, and in response to receiving the authentication information from the image processing apparatus via the communication interface, transmit the communication instruction information to the image processing apparatus via the communication interface.

According to aspects of the present disclosure, further provided is a non-transitory computer-readable medium storing computer-readable instructions that are executable by a processor coupled with an information processing terminal device, the information processing terminal device including a communication interface, a near-field communication interface, and a user interface, the instructions being configured to, when executed by the processor, cause the processor to accept, via the user interface, an input of an instruction to perform a preparation process to connect an image processing apparatus with a service providing apparatus, in response to accepting the input of the instruction to perform the preparation process via the user interface, transmit transmission request information to a server on an Internet via the communication interface, the transmission request information being for requesting the server to transmit authentication information, the authentication information representing authorization to perform data communication with the service providing apparatus, receive the authentication information from the server via the communication interface, store the received authentication information, and transmit the stored authentication information to the image processing apparatus via the near-field communication interface, using a near-field wireless communication protocol.

BRIEF DESCRIPTION OF THE ACCOMPANYING DRAWINGS

FIG. 1 schematically shows a configuration of a communication system including a multi-function peripheral (hereinafter referred to as an "MFP"), a server, a mobile terminal device, and an information processing terminal device, in an illustrative embodiment according to one or more aspects of the present disclosure.

Figures 3A, 3B:
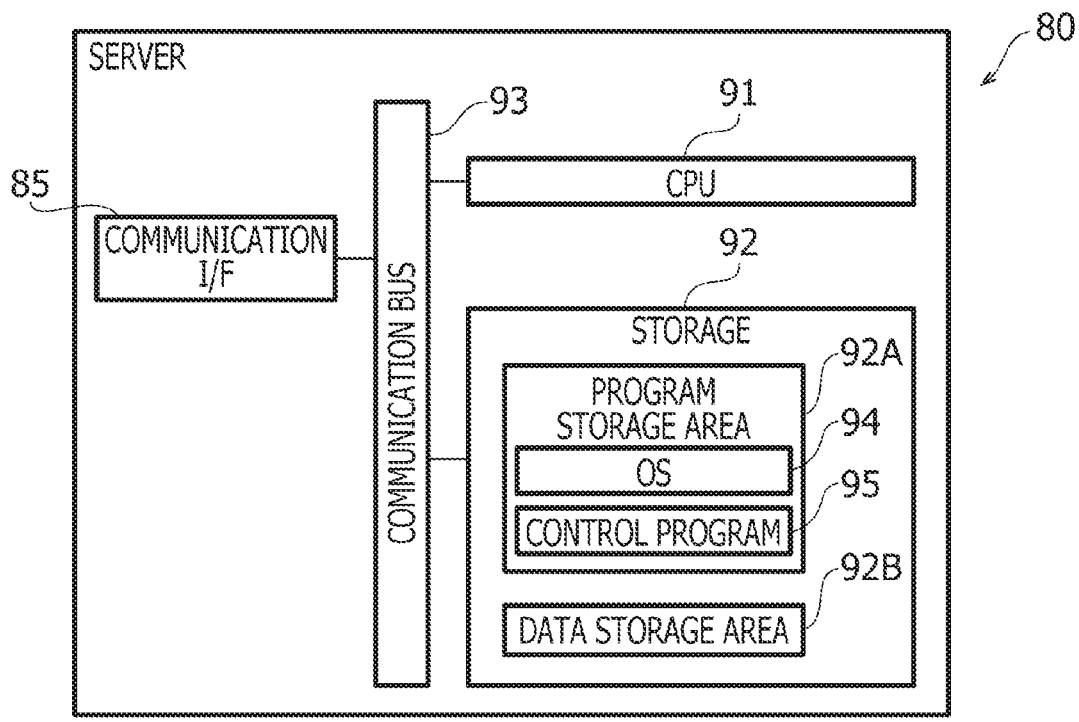
FIG. 3A is a functional block diagram of the server in the illustrative embodiment according to one or more aspects of the present disclosure.

FIG. 3B exemplifies refresh tokens (hereinafter referred to as "R-tokens") and PINs ("PIN" is an abbreviated form of "Personal Identification Number") stored in a data storage area of the server in association with each other, in the illustrative embodiment according to one or more aspects of the present disclosure.

Figure 4:
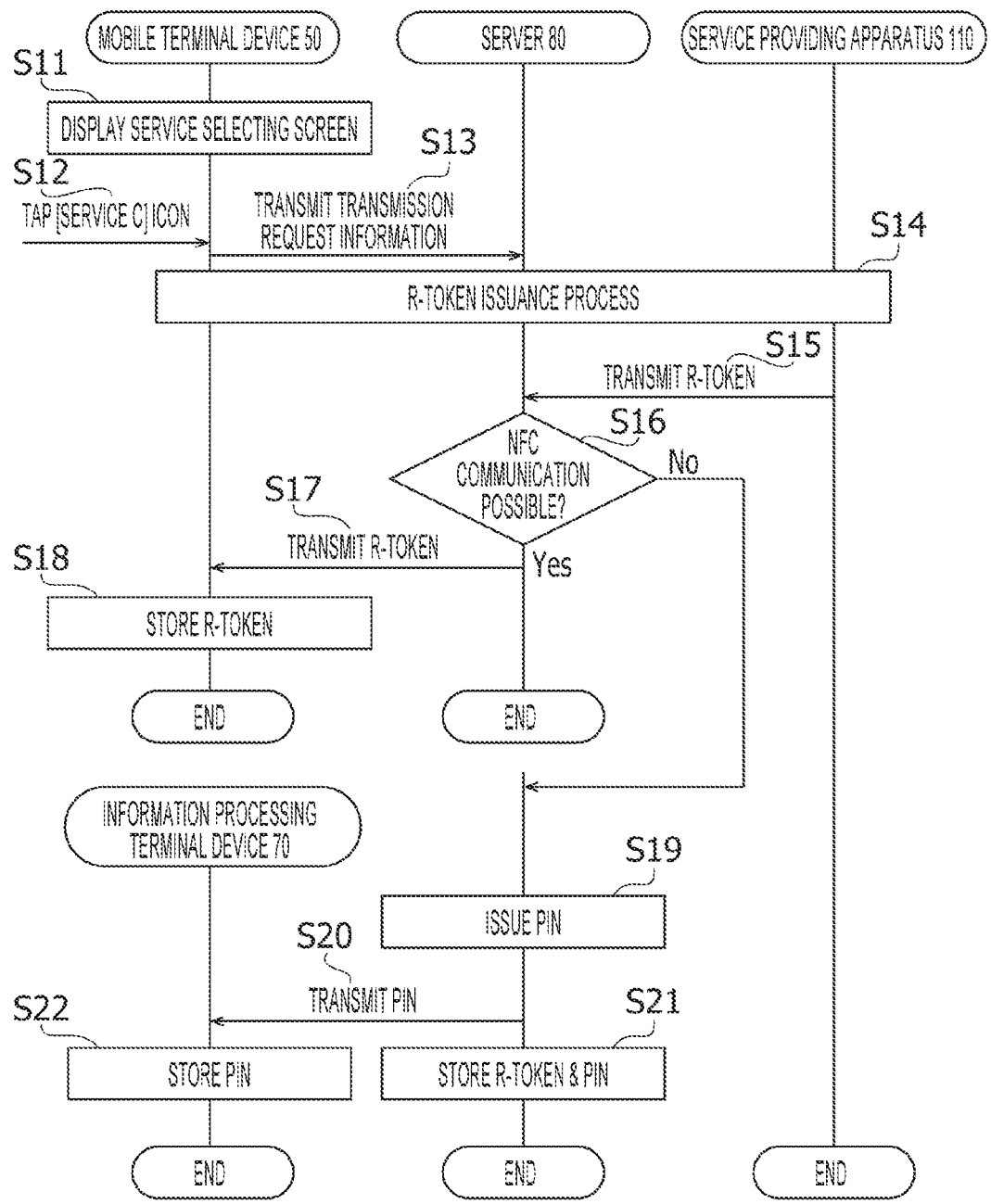

FIG. 4 is a flowchart showing a procedure of a preparation process in the illustrative embodiment according to one or more aspects of the present disclosure.

Figure 5:
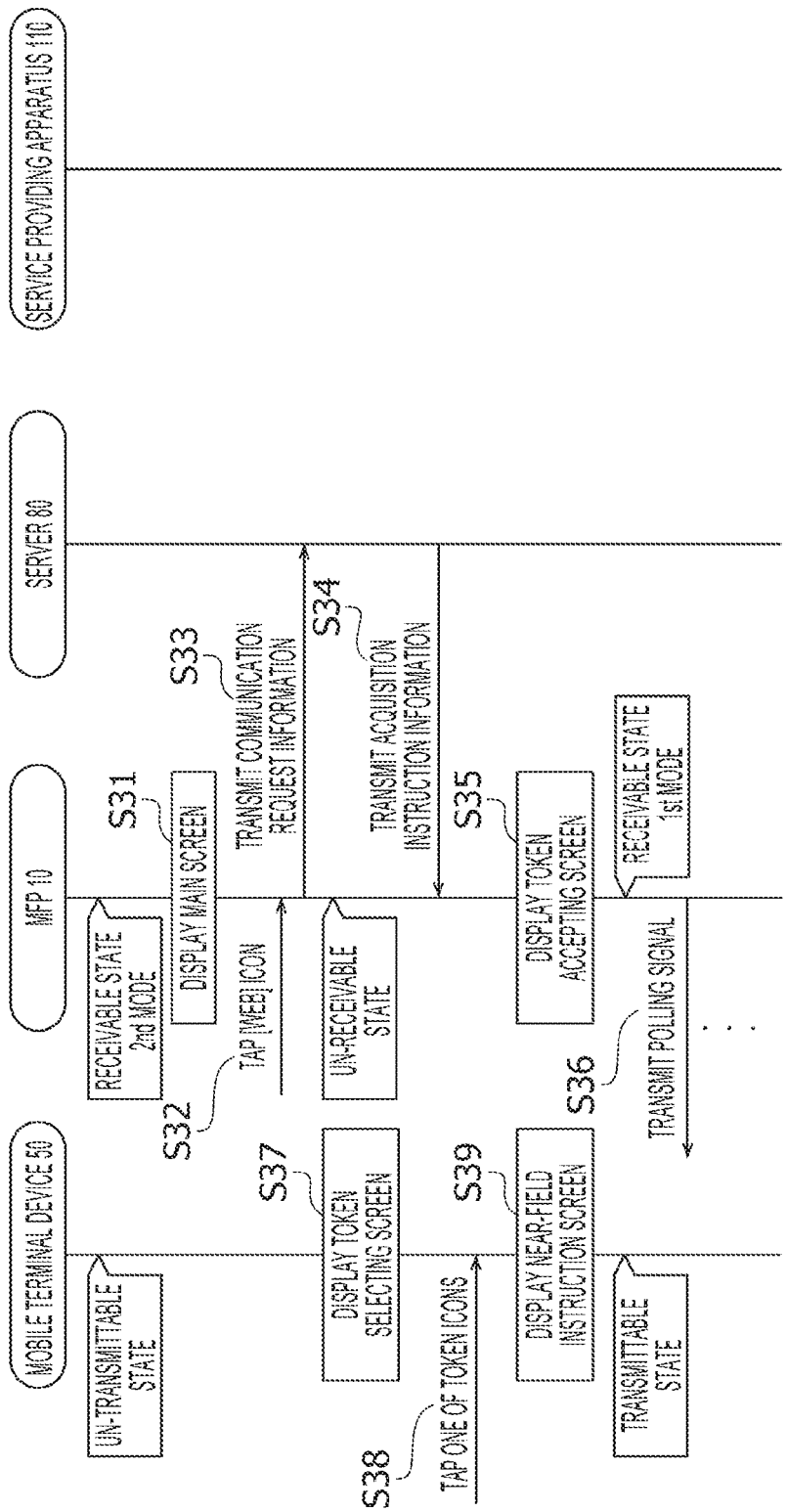

FIGS. 5 and 6 are flowcharts showing a procedure of a service execution process in the illustrative embodiment according to one or more aspects of the present disclosure.

Figure 7A:
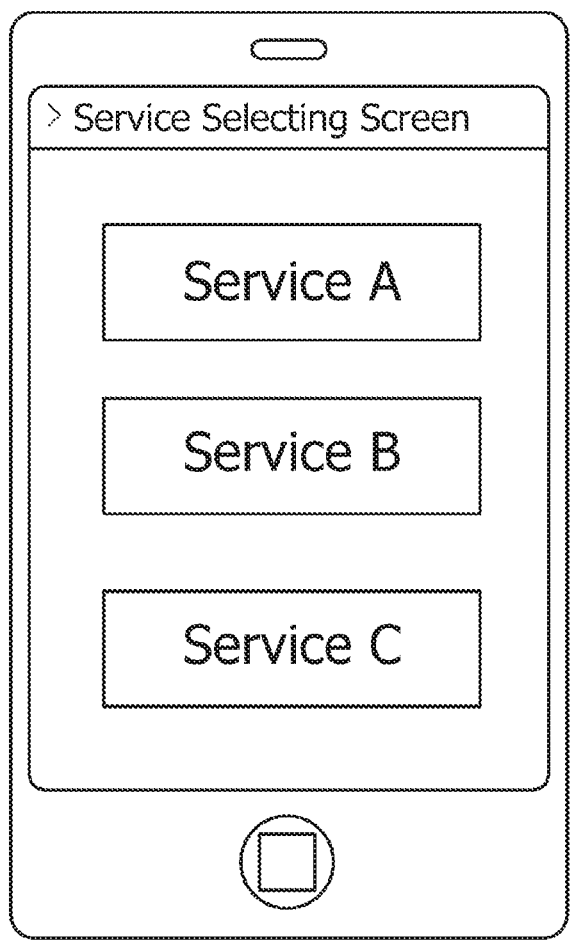

FIG. 7A exemplifies a service selecting screen to be displayed on a display of the mobile terminal device in the illustrative embodiment according to one or more aspects of the present disclosure.

Figure 7B:
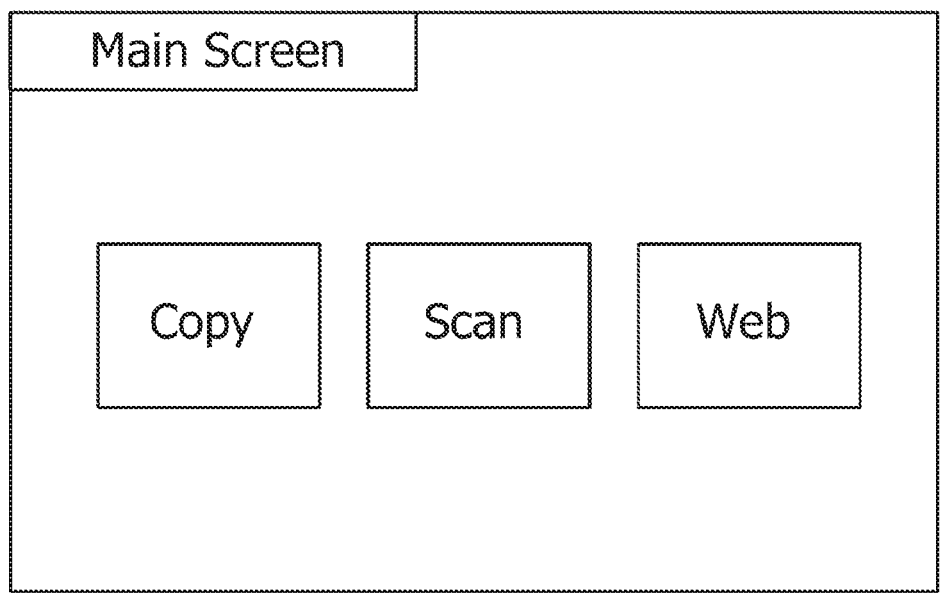

FIG. 7B exemplifies a main screen to be displayed on a display of the MFP in the illustrative embodiment according to one or more aspects of the present disclosure.

Figure 8A:
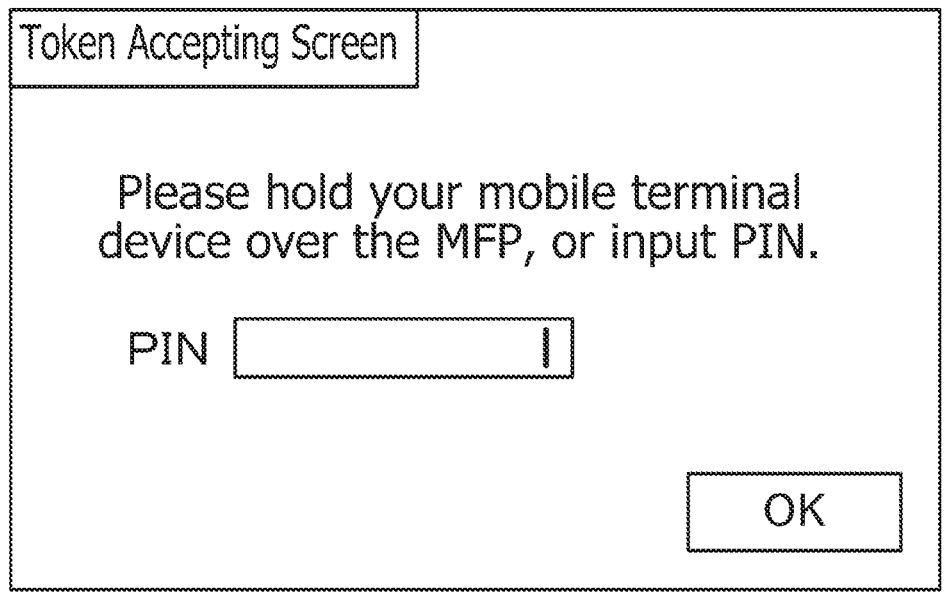

FIG. 8A exemplifies a token accepting screen to be displayed on the display of the MFP in the illustrative embodiment according to one or more aspects of the present disclosure.

Figure 8B:
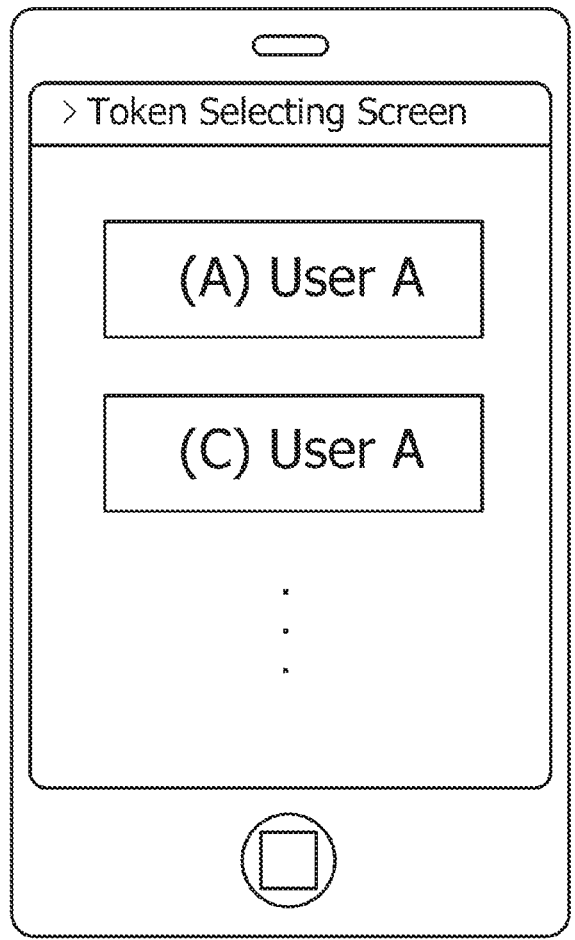

FIG. 8B exemplifies a token selecting screen to be displayed on the display of the mobile terminal device in the illustrative embodiment according to one or more aspects of the present disclosure.

Figure 9A:
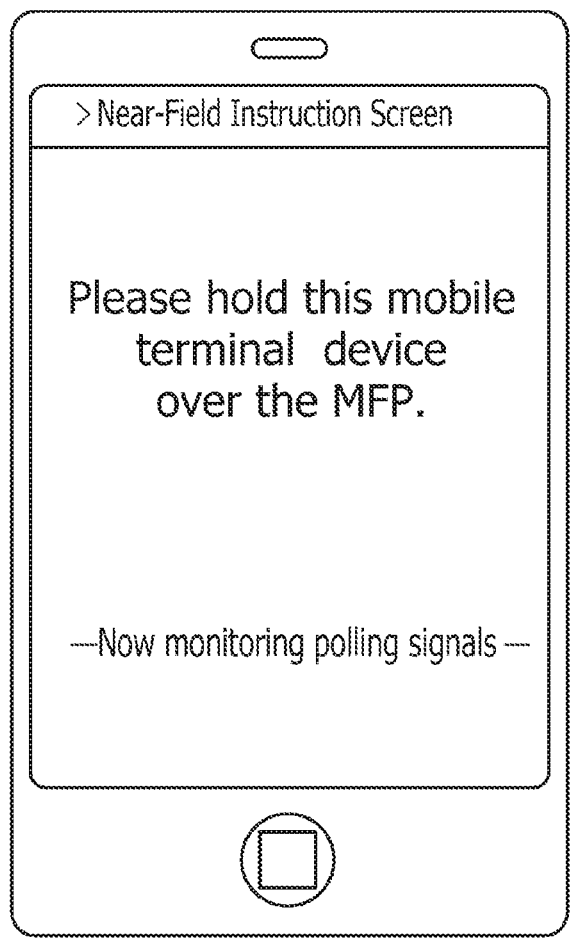

FIG. 9A exemplifies a near-field instruction screen to be displayed on the display of the mobile terminal device in the illustrative embodiment according to one or more aspects of the present disclosure.

Figure 9B:
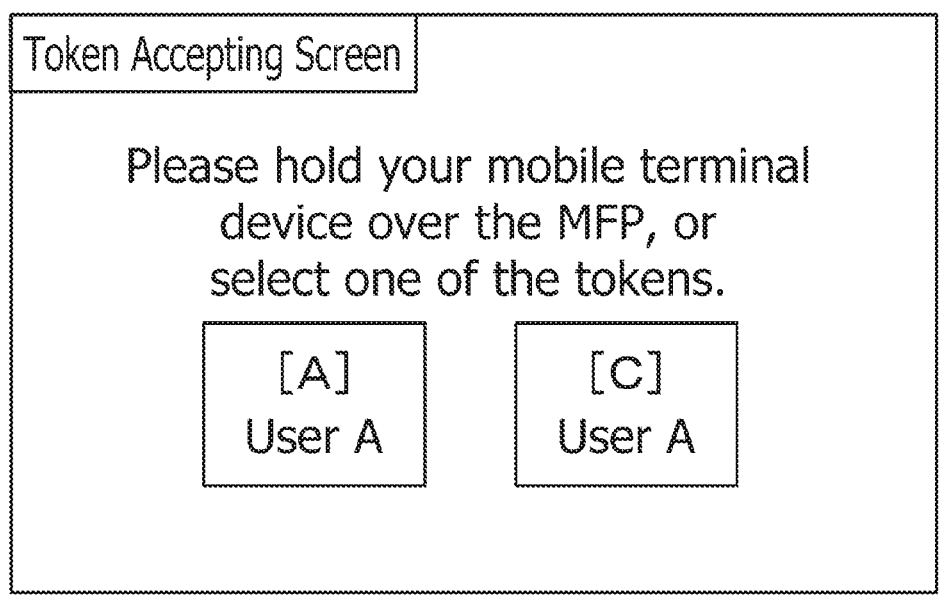

FIG. 9B exemplifies a token accepting screen to be displayed on the display of the MFP in the illustrative embodiment according to one or more aspects of the present disclosure.

FIG. 10 is a flowchart showing a procedure of a service execution process in a first modification according to one or more aspects of the present disclosure.

Figure 11:
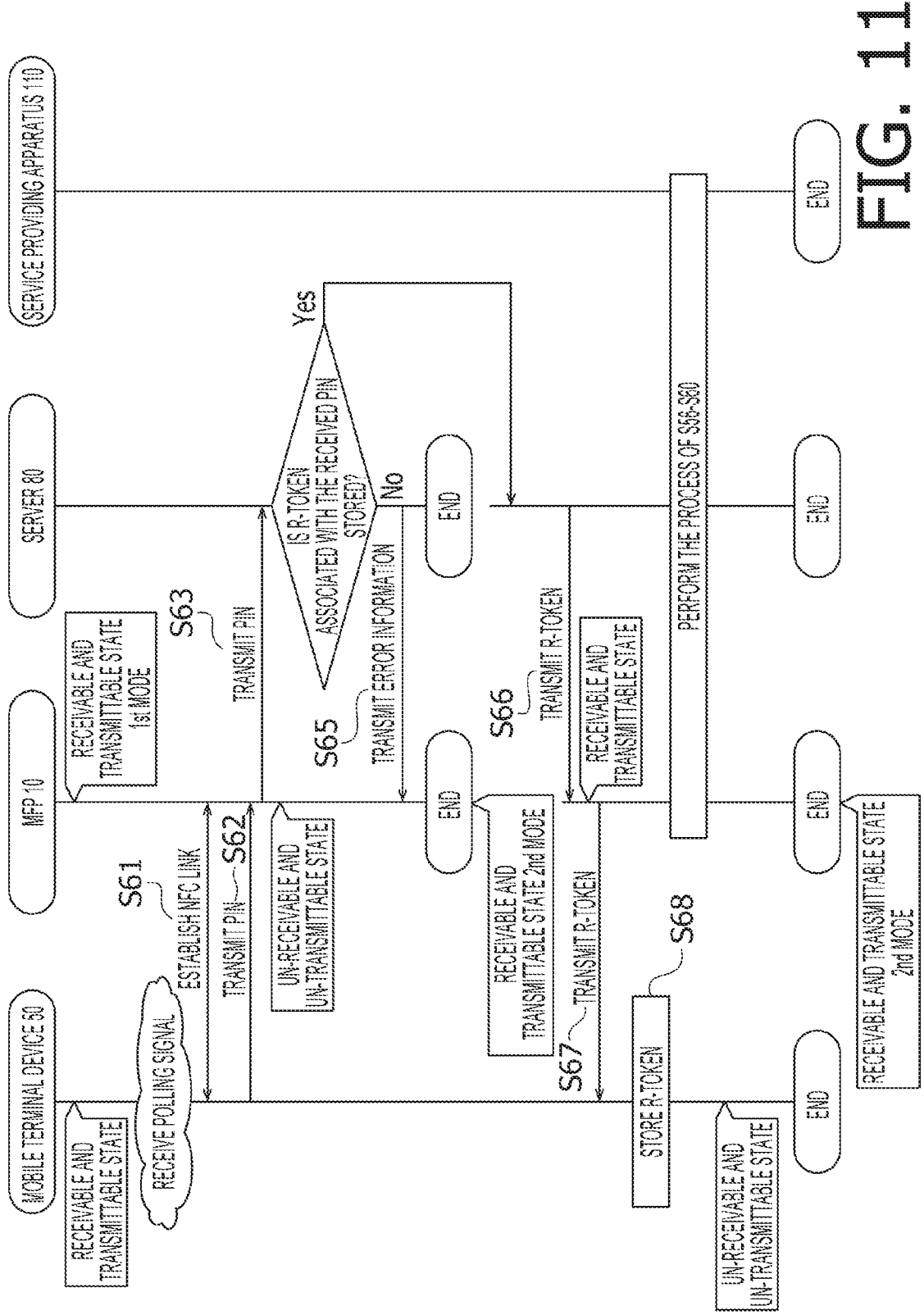

FIG. 11 is a flowchart showing a procedure of a service execution process in a second modification according to one or more aspects of the present disclosure.

Figure 12:
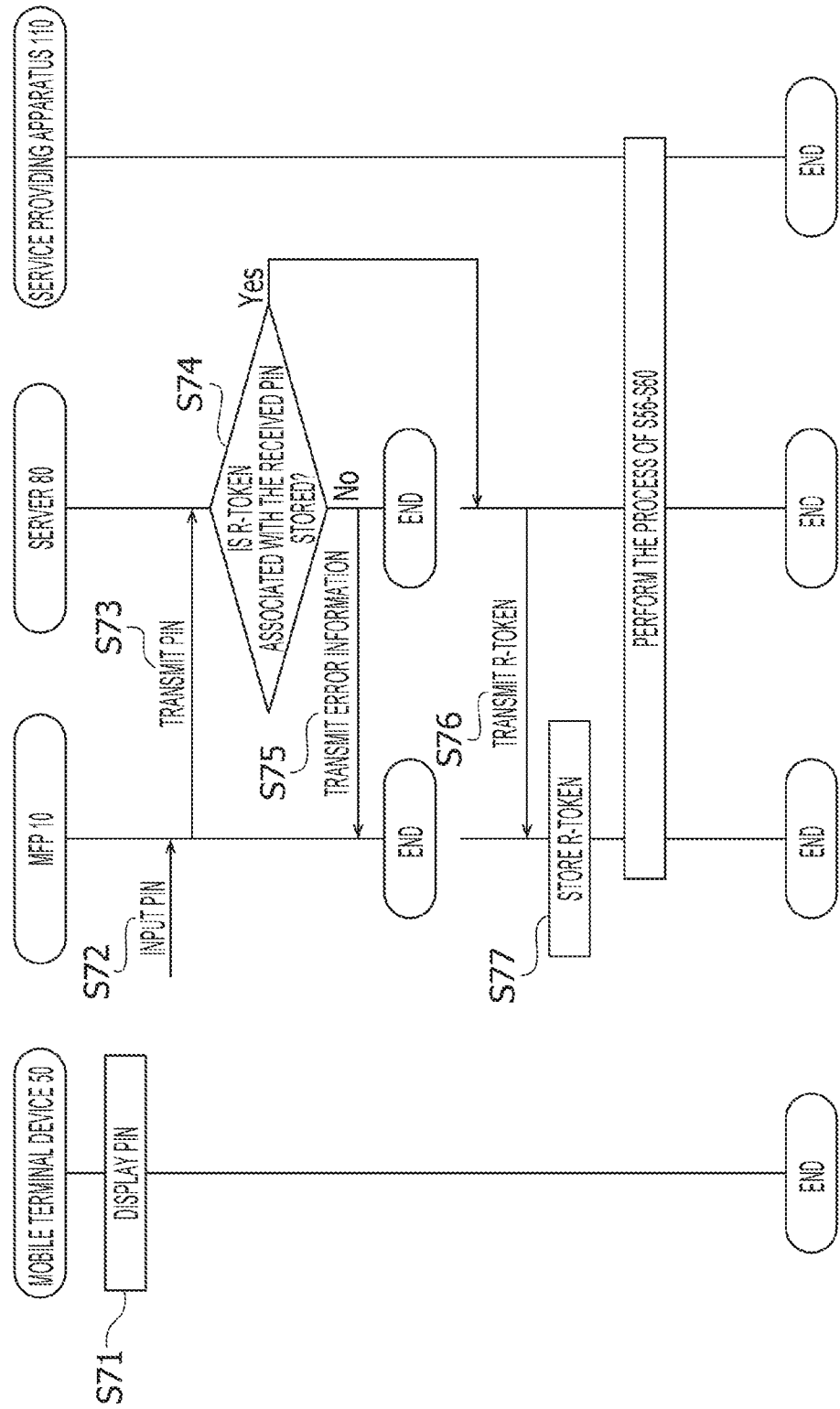
Figure 13:
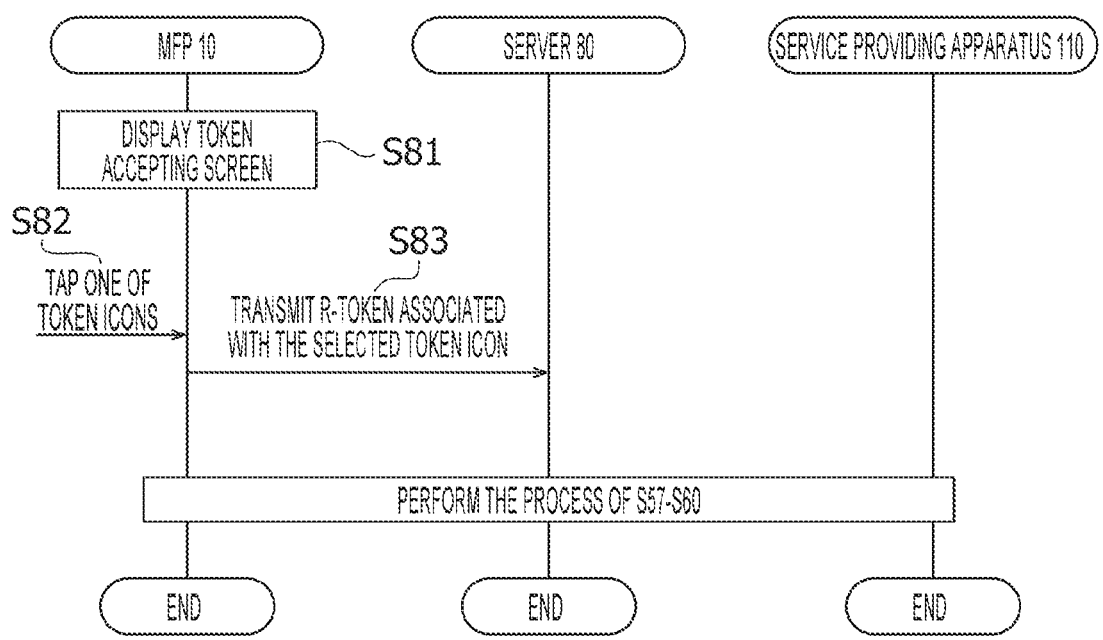

FIGS. 12 and 13 are flowcharts each showing a service execution process in a third modification according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
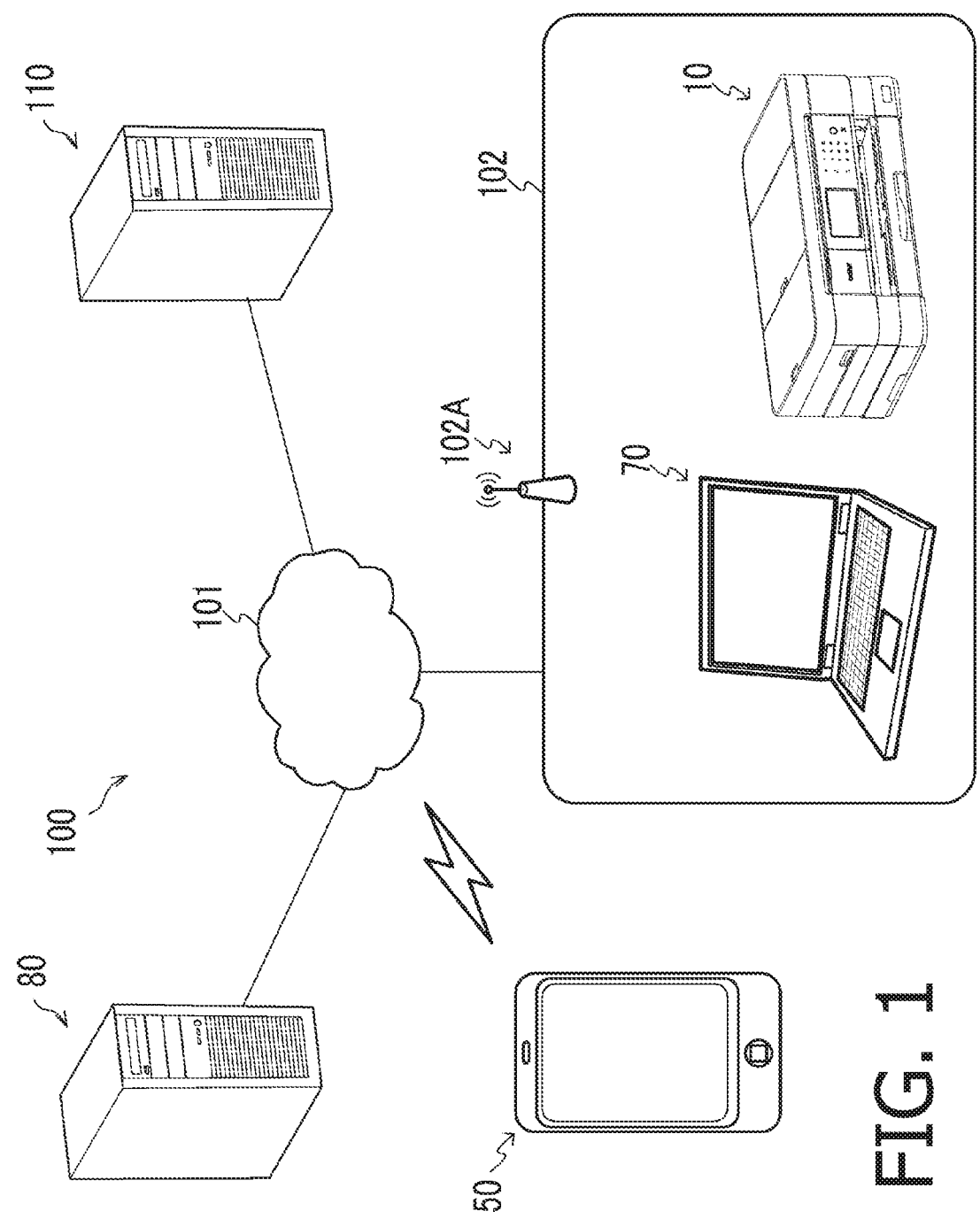

FIG. 1 schematically shows a communication system 100 in the illustrative embodiment. As shown in FIG. 1, the communication system 100 includes a multi-function peripheral (hereinafter referred to as an "MFP") 10, a mobile terminal device 50, and a server 80. The communication system 100 may further include an information processing terminal device 70. The communication system 100 is configured to receive services from the service providing apparatus 110. The MFP 10, the mobile terminal device 50, the information processing terminal device 70, the server 80, and the service providing apparatus 110 may communicably be interconnected via one or more communication networks such as an Internet 101, a wired LAN, a wireless LAN 102, and a combination of the Internet 101, the wired LAN, and the wireless LAN 102. It is noted that "LAN" is an abbreviated form of "Local Area Network."

The MFP 10 and the information processing terminal device 70 belong to the wireless LAN 102. The wireless LAN 102 is connected with the Internet 101 via a router (not shown). The mobile terminal device 50 is connected with the Internet 101 via a base station (not shown). The server 80 and the service providing apparatus 110 are connected with the Internet 101. It is noted that "the MFP 10 and the information processing terminal device 70 belonging to the wireless LAN 102" represents that the MFP 10 and the information processing terminal device 70 are set to belong to the wireless LAN 102 and communicable with other devices belonging to the wireless LAN 102. More specifically, the same SSID as an access point 102A of the wireless LAN 102 is set for the MFP 10 and the information processing terminal device 70. The same network address as assigned to the wireless LAN 102 is provided to the MFP 10 and the information processing terminal device 70.

The MFP 10 and the information processing terminal device 70 are configured to communicate with the server 80 and the service providing apparatus 110 via the Internet 101 from the access point 102A and the router (not shown). The mobile terminal device 50 is configured to perform wireless communication with the server 80 and the service providing apparatus 110 via the Internet 101 from the base station (not shown). The communication via the Internet 101 is an example of indirect communication with an external device via a communication device. Further, the MFP 10 and the mobile terminal device 50 are allowed to perform wireless communication therebetween without involving the Internet 101. The communication without involving the Internet 101 is an example of direct communication that is wireless communication with an external device without involving any communication device. The router (not shown) and the base station (not shown) are examples of communication devices.

It is noted that "wireless communication" is not limited to wireless communication throughout an entire range of communication section. Namely, "the MFP 10 performs wireless data communication via the access point 102A" may represent that the communication by the MFP 10 via the access point 102A includes at least wireless communication between the MFP 10 and the access point 102A. The same applies to the mobile terminal device 50 and the information processing terminal device 70.

MFP

Figure 2A:
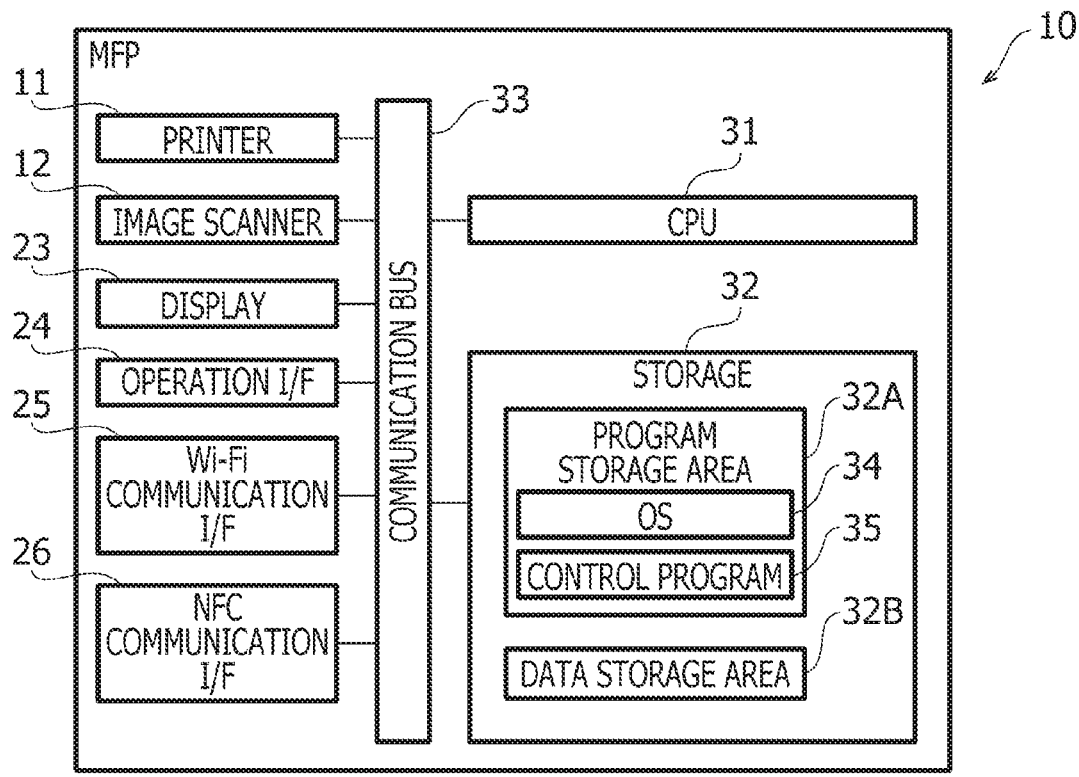
FIG. 2A is a functional block diagram of the MFP in the illustrative embodiment according to one or more aspects of the present disclosure.

As shown in FIG. 2A, the MFP 10 includes a printer 11, an image scanner 12, a display 23, an operation interface 24, a Wi-Fi (trademark registered by Wi-Fi Alliance) communication interface 25, an NFC (which is an abbreviated form of "Near Field Communication") communication interface 26, a CPU 31, a storage 32, and a communication bus 33. Individual elements included in the MFP 10 are interconnected via the communication bus 33. The MFP 10 is an example of an image processing apparatus. The printer 11 and the image scanner 12 are examples of an image processor. The Wi-Fi communication interface 25 is an example of a second communication interface and an example of a communication interface of the image processing apparatus. The NFC communication interface 26 is an example of a second near-field communication interface and an example of a near-field communication interface of the image processing apparatus.

Printer and Image Scanner

The printer 11 is configured to perform a recording process of recording an image expressed by image data on a recording sheet. As a recording method of the printer 11, known methods may be employed such as an inkjet method and an electrophotographic method. The image scanner 12 is configured to perform a scanning process of scanning an image recorded on a document sheet and generating image data. The MFP 10 may further have other functions such as a facsimile function to perform facsimile communication and a copy function to scan an image recorded on a document sheet and record the scanned image on a recording sheet.

Display

The display 23 has a display screen configured to display various kinds of information. As the display 23, various types of displays may be used such as an LCD (which is an abbreviated form of "Liquid Crystal Display") and an OELD (which is an abbreviated form of "Organic Electro-Luminescence Display").

Operation Interface

The operation interface 24 is configured to accept a user operation of selecting one of objects displayed on the display screen of the display 23. Specifically, the operation interface 24 has buttons, and is configured to, when a button is pressed, transmit to the CPU 31 an operation signal associated with the pressed button. The operation interface 24 may include a filmy touch sensor formed on the display screen of the display 23. Namely, the display 23 may be configured as a touch panel display.

It is noted that the "objects" represent images selectable by a user operation via the operation interface 24. For instance, the objects may be character strings displayed on the display 23. When a direction key of the operation interface 24 is pressed, one of the objects may be displayed in a highlighted manner. Then, when a determination button of the operation interface 24 is pressed, the highlighted object may be selected. Further, for example, when the operation interface 24 is a touch panel, the objects may include icons, buttons, and links displayed on the display 23. Then, an object displayed in a touched position on the operation interface 24 (i.e., the touch panel) may be selected.

The operation interface 24, which is configured as a touch panel, accepts a user operation of touching a position on the display screen of the display 23. Then, the operation interface 24 outputs position information that indicates the touched position on the display screen. For instance, the position information may be expressed as coordinates (x, y) on an x-y plane with an upper left end of the display screen as an origin, a rightward direction of the display screen as a positive direction of an x-axis, and a downward direction of the display screen as a positive direction of a y-axis. As the touch sensor, known types of touch sensors may be used such as an electrostatic capacitive touch sensor and a resistive film type touch sensor.

It is noted that, in the present disclosure, "touch" may include every operation of bringing an input medium in touch with a position on the display screen. Specifically, "touch" may include a tapping operation of separating the input medium touching the display screen away from the display screen in a particular period of time, a long touching operation of letting the input medium touching the display screen statically stay on the display screen, a sliding operation of sliding the input medium in touch with the display screen, a flick operation of sliding the input medium in touch with the display screen with a sliding acceleration equal to or more than a threshold value, a pinch-in operation of sliding two input media to become closer to each other from respective different positions on the display positions, and a pinch-out operation of sliding two input media to become farther away from each other from respective different positions on the display positions.

Furthermore, "touch" may include an operation of bringing the input medium in proximity to the display screen even though the input medium is not brought into contact with the display screen. The input medium may include a user's finger and a stylus pen.

Wi-Fi Communication Interface

The Wi-Fi communication interface 25 is an interface for performing wireless communication with external devices. Specifically, the Wi-Fi communication interface 25 is configured to perform indirect communication with the mobile terminal device 50, the information processing terminal device 70, the server 80, and the service providing apparatus 110, and perform direct communication with the mobile terminal device 50. For instance, the Wi-Fi communication interface 25 performs communication in accordance with a protocol complying with IEEE 802.11 standards. In this case, the indirect communication indicates communication in an infrastructure mode. The direct communication indicates communication in an ad hoc mode or Wi-Fi direct communication.

NFC Communication Interface

The NFC communication interface 26 is an interface for performing wireless communication in accordance with a near-field protocol complying with NFC standards. Wireless communication with external devices via the NFC communication interface 26 is an example of the direct communication and an example of near-field wireless communication. The NFC communication interface 26 includes an IC chip incorporated therein. The IC chip has a memory configured to store information to be communicated with external devices. The NFC standards may be exemplified as standards for defining a near-field communication protocol. Further, TransferJet (trademark registered by TransferJet Consortium) may be exemplified as standards for defining a near-field communication protocol.

In the present disclosure, devices configured to perform communication in accordance with a protocol complying with the NFC standards may be referred to as "NFC devices." In addition, communication according to a protocol complying with the NFC standards may be referred to as "NFC communication." Namely, the MFP 10 and the mobile terminal device 50 are examples of the NFC devices. The MFP 10 and the mobile terminal device 50 operate in one of modes such as a P2P (which is an abbreviated form of "Peer to Peer") mode, a Reader mode, a Writer mode, and a CE (which is an abbreviated form of "Card Emulation") mode. In the present disclosure, the Reader mode and the Writer mode may collectively be referred to as an "R/W mode."

The P2P mode is a mode for performing bidirectional communication between two NFC devices. NFC devices of "Type A" defined in ISO/IEC 1443 determined by NFC Forum are allowed to operate in the P2P mode. Further, NFC devices of "Type F" defined in ISO/IEC 18092 determined by NFC Forum are allowed to operate in the P2P mode. Meanwhile, NFC devices of "Type B" defined in ISO/IEC 1443 determined by NFC Forum are not allowed to operate in the P2P mode.

The R/W mode and the CE mode are modes for performing unidirectional communication between two NFC devices. The CE mode is a mode for an NFC device to operate as a "Card" that is a format defined by the NFC Forum. NFC devices in Type A, Type F, and Type B are allowed to operate in the CE mode. The Reader mode is a mode for reading information out of an NFC device operating in the CE mode. The Writer mode is a mode for writing information into an NFC device operating in the CE mode.

In the illustrative embodiment, a main explanation will be provided of an example where the MFP 10 operates in the R/W mode, and the mobile terminal device 50 operates in the CE mode. In this example, namely, the MFP 10 that operates in the R/W mode is allowed to read information out of the mobile terminal device 50 that operates in the CE mode and write information into the mobile terminal device 50. Nonetheless, the present disclosure is not limited to the example. For instance, the MFP 10 may operate in the CE mode, and the mobile terminal device 50 may operate in the R/W mode. Both the MFP 10 and the mobile terminal device 50 may operate in the P2P mode.

In the illustrative embodiment, the NFC communication interface 26 of the MFP 10 performs a "Poll" operation. The Poll operation is an operation of repeatedly outputting a polling signal at intervals of a predetermined period of time and monitoring a response signal to the polling signal. On the other hand, in the illustrative embodiment, the NFC communication interface 56 of the mobile terminal device 50 performs a "Listen" operation. The "Listen" operation is an operation of monitoring a polling signal and outputting a response signal in response to receipt of the polling signal.

In response to the mobile terminal device 50 being brought close to the MFP 10, the NFC communication interface 56 of the mobile terminal device 50 receives a polling signal from the NFC communication interface 26 of the MFP 10. Then, when the NFC communication interface 26 of the MFP 10 receives a response signal from the NFC communication interface 56 of the mobile terminal device 50, an NFC communication link (hereinafter referred to as an "NFC link") is established between the MFP 10 and the mobile terminal device 50 in accordance with a predetermined procedure complying with the NFC standards. After that, the MFP 10 and the mobile terminal device 50 perform data communication with each other via the NFC link.

Nonetheless, the relationship between the MFP 10 and the mobile terminal device 50 is not limited to the aforementioned example. For instance, the NFC communication interface 26 of the MFP 10 may perform a "Listen" operation, and the NFC communication interface 56 of the mobile terminal device 50 may perform the Poll operation. In this case, in response to the mobile terminal device 50 being brought close to the MFP 10, the NFC communication interface 26 of the MFP 10 receives a polling signal from the NFC communication interface 56 of the mobile terminal device 50. Then, when the NFC communication interface 56 of the mobile terminal device 50 receives a response signal from the NFC communication interface 26 of the MFP 10, an NFC link may be established between the MFP 10 and the mobile terminal device 50.

CPU

The CPU (which is an abbreviated form of "Central Processing Unit") 31 is configured to take overall control of the MFP 10. The CPU 31 acquires below-mentioned various programs from the storage 32 and executes the acquired programs, based on various kinds of information output from the operation interface 24 and various kinds of information acquired from external devices via the Wi-Fi communication interface 25 and/or the NFC communication interface 26. Namely, the CPU 31 and the storage 32 form an example of a second controller and an example of a controller of the image processing apparatus. More specifically, the CPU 31 executing a control program 35 is an example of the second controller and an example of the controller of the image processing apparatus.

Storage

The storage 32 has a program storage area 32A and a data storage area 32B. The program storage area 32A stores therein an OS (which is an abbreviated form of "Operating System") 34 and the control program 35. The OS 34 and the control program 35 are programs build in a binary format. The control program 35 may be a single program, or may be an integration or collection of a plurality of programs. The data storage area 32B stores therein data and/or information necessary for execution of the control program 35. The storage 32 is an example of an apparatus-side storage.

It is noted that, in the present disclosure, "data" and "information" are similar to each other in that each of "data" and "information" is a computer-treatable bit or a computer-treatable bit string. The "data" is such one or more bits that a computer is allowed to treat them without considering what is denoted by each bit contained therein. Meanwhile, the "information" is such one or more bits that a process by a computer diverges depending on what is denoted by each bit contained therein. Further, an "instruction" is one or more control signals that prompt a transmission destination device to perform a next operation. The "instruction" may contain information, or the "instruction" itself may have a property as information.

Further, regarding "data" and "information," even though a format (e.g., a text format, a binary format, and a flag format) thereof is changed for each of a plurality of computers, as far as they are recognized as having substantially the same contents among the plurality of computers, they may be treated as the same data and information. For instance, a situation may be possible, in which information representing "two" is held as text-format information such as "0x32" in ASCII code in a computer, and is held as binary-format information such as "10" in binary notation in another computer.

Nonetheless, the aforementioned discrimination between "data" and "information" is not so strict, and exceptional treatment thereof may be acceptable. For instance, "data" may be temporarily treated as "information," and "information" may be temporarily treated as "data." Further, what is treated as "data" in a device may be treated as "information" in another device. Moreover, "information" may be taken out of "data," and "data" may be taken out of "information."

The storage 32 may be, for instance, one of or a combination of at least two of a RAM, a ROM, an EEPROM, an HDD, and a buffer of the CPU 31. It is noted that RAM is an abbreviated form of "Random Access Memory," ROM is an abbreviated form of "Read-Only Memory," EEPROM is an abbreviated form of "Electrically Erasable Programmable Read-Only Memory," and HDD is an abbreviated form of "Hard Disk Drive."

The storage 32 may be a non-transitory computer-readable storage medium. The non-transitory computer-readable medium may include recording medium such as a CD-ROM and a DVD-ROM as well as the RAM, the ROM, the EEPROM, the HDD, and the buffer of the CPU 31. The non-transitory computer-readable medium may be a tangible medium. It is noted that the non-transitory computer-readable medium does not include any electric signal such as a carrier wave for carrying a program downloaded from a server on the Internet.

The programs stored in the program storage area 32A are executed by the CPU 31. Nonetheless, in the present disclosure, operations to be implemented by execution of the programs may be described with omission of the CPU 31. Namely, in the following description, a description "a program A performs a process A" may represent "the CPU 31 executing the program A performs the process A."

The OS 34 is a basic program that provides an API (which is an abbreviated form of "Application Programming Interface") for controlling hardware elements included in the MFP 10 such as the printer 11, the image scanner 12, the display 23, the operation interface 24, the Wi-Fi communication interface 25, and the NFC communication interface 26. Namely, each of the aforementioned programs controls a corresponding hardware element by invoking the API provided by the OS 34. Nonetheless, in the present disclosure, operations to be implemented by execution of the programs may be described with omission of the OS 34. Namely, in the following description, a description "a program B controls a hardware element C" may represent "the program B controls the hardware element C via the API provided by the OS 34."

Mobile Terminal Device

Figure 2B:
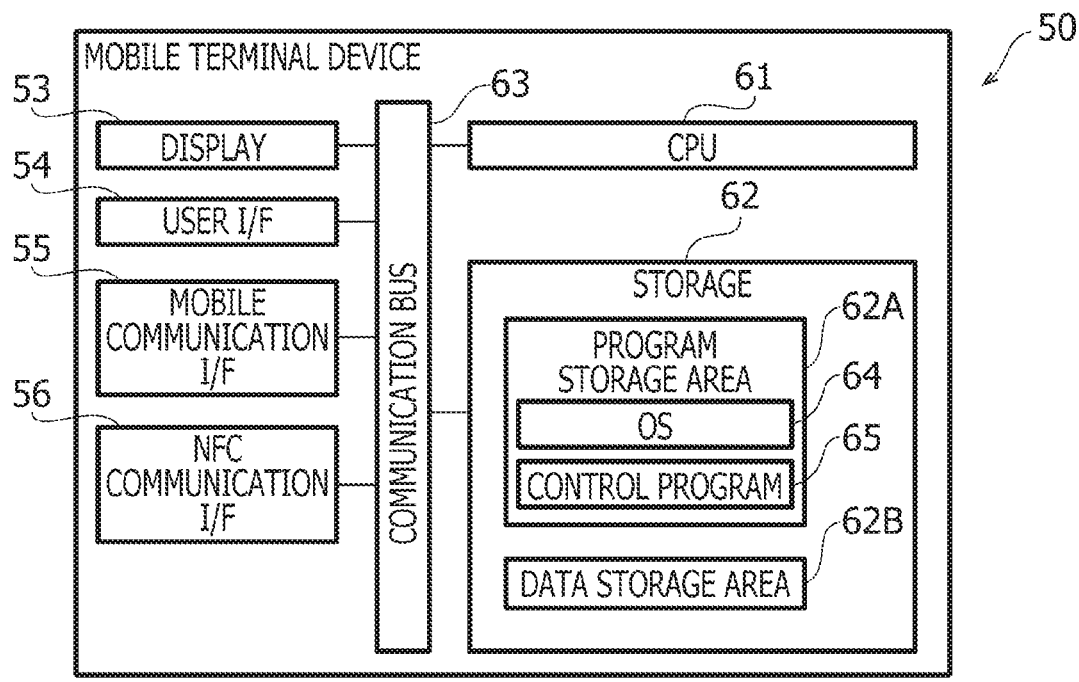
FIG. 2B is a functional block diagram of the mobile terminal device in the illustrative embodiment according to one or more aspects of the present disclosure.

As shown in FIG. 2B, the mobile terminal device 50 includes a display 53, a user interface 54, a mobile communication interface 55, an NFC communication interface 56, a CPU 61, a storage 62, and a communication bus 63. The mobile terminal device 50 is an example of a first information processing terminal device. The mobile communication interface 55 is an example of a first communication interface and an example of a communication interface of an information processing terminal device. The NFC communication interface 56 is an example of a first near-field communication interface and an example of a near-field communication interface of the information processing terminal device. The CPU 61 and the storage 62 form an example of a first controller and an example of a controller of the information processing terminal device. More specifically, the CPU 61 executing a control program 65 is an example of the first controller and an example of the controller of the information processing terminal device. The storage 62 is an example of a terminal-side storage and an example of a storage of the information processing terminal device. Elements included in the mobile terminal device 50 such as the display 53, the user interface 54, the NFC communication interface 56, the CPU 61, the storage 62, and the communication bus 63 may have substantially the same configurations (functions) as elements included in the MFP 10 such as the display 23, the operation interface 24, the NFC communication interface 26, the CPU 31, the storage 32, and the communication bus 33, respectively. Therefore, redundant explanations of the elements included in the mobile terminal device 50 will be omitted.

The mobile communication interface 55 is an interface configured to connect with a mobile communication network (not shown) provided by a communication provider. The mobile communication network (not shown) is connected with the Internet 101. For instance, the mobile communication interface 55 performs wireless communication in accordance with communication standards such as W-CDMA, CDMA2000, or LTE. It is noted that W-CDMA is an abbreviated form of "Wideband Code Division Multiple Access," and LTE is an abbreviated form of "Long Term Evolution." Further, it is noted that the mobile terminal device 50 may include a Wi-Fi communication interface, in addition to or instead of the mobile communication interface 55. In this case, the Wi-Fi communication interface of the mobile terminal device 50 may have substantially the same functions as the Wi-Fi communication interface 25 of the MFP 10.

A functional block diagram of the information processing terminal device 70 may be substantially the same as the functional block diagram of the mobile terminal device 50 shown in FIG. 2B, except for the following differences. The information processing terminal device 70 includes a Wi-Fi communication interface, instead of the mobile communication interface 55, and does not include (an equivalent of) the NFC communication interface 56. Regarding the other points, the information processing terminal device 70 may be configured substantially in the same manner as the mobile terminal device 50. Although the information processing terminal device 70 is not limited to a specific example, the information processing terminal device 70 may be a PC (which is an abbreviated form of "Personal Computer"). The information processing terminal device 70 is an example of a second information processing terminal device.

Server

As shown in FIG. 3A, the server 80 includes a communication interface 85, a CPU 91, a storage 92, and a communication bus 93. The CPU 91 and the storage 92 form an example of a third controller and an example of a controller of a server. More specifically, the CPU 91 executing a control program 95 is an example of the third controller and an example of the controller of the server. The storage 92 is an example of a server-side storage and an example of a storage of the server. Elements included in the server 80 such as the communication interface 85, the CPU 91, the storage 92, and the communication bus 93 may have substantially the same configurations (functions) as elements included in the MFP 10 such as the Wi-Fi communication interface 25, the CPU 31, the storage 32, and the communication bus 33, respectively. Therefore, redundant explanations of the elements included in the server 80 will be omitted.

As shown in FIG. 3B, for instance, the data storage area 92B is configured to store therein refresh tokens (hereinafter referred to as "R-tokens") and PINs ("PIN" is an abbreviated form of "Personal Identification Number") associated with the R-tokens. Each R-token represents authorization to perform data communication with the service providing apparatus 110. Each R-token is an example of first authentication information and an example of master authentication information. Each PIN is an example of second authentication information to be issued by the server 80 in association with a corresponding R-token. Although the R-token and the PIN are not limited to specific examples, the R-token may be binary data, and the PIN may be a numerical string.

Service Providing Apparatus

The service providing apparatus 110 is configured to provide services to the MFP 10. For instance, the service providing apparatus 110 may provide the MFP 10 with a service to store uploaded data, a service to download stored data, and a service to convert a data format.

Coordinated Operation by MFP with Server

The MFP 10 is allowed to execute the coordinated operation in cooperation with the server 80. The coordinated operation is started in response to the MFP 10 accepting via the operation interface 24 an instruction to start the coordinated operation. When the coordinated operation is started, the control program 35 (more specifically, the CPU 31 executing the control program 35) stores, into the data storage area 32B, coordinated-operation information representing that the MFP 10 is performing the coordinated operation. Hereinafter, for the sake of explanatory convenience, a state where the coordinated-operation information is stored in the data storage area 32B (i.e., a state where the MFP 10 is performing the coordinated operation in cooperation with the server 80) will be referred to as a "coordinated-operation state." In addition, for the sake of explanatory convenience, a state where the coordinated-operation information is not stored in the data storage area 32B (i.e., a state where the MFP 10 is not performing the coordinated operation in cooperation with the server 80) will be referred to as a "non-coordinated-operation state."

When the MFP 10 is powered on, the coordinated-operation information is not stored in the data storage area 32B. Namely, immediately after powered on, the MFP 10 is in the non-coordinated-operation state. Further, when the MFP 10 is powered on, the control program 35 controls the display 23 to display a standby screen. Information for displaying the standby screen is not information received from the server 80 via the coordinated operation. On the standby screen, a coordinated-operation icon for accepting an instruction to start the coordinated operation is displayed. In response to accepting a user operation of tapping a position of the coordinated-operation icon via the operation interface 24, the control program 35 controls the storage 32 to store the coordinated-operation information into the data storage area 32B, and controls the Wi-Fi communication interface 25 to transmit to the server 80 coordinated-operation start information as a request via HTTP communication.

In response to receiving the coordinated-operation start information from the MFP 10, the server 80 transmits instruction information as a response via the HTTP communication, to the MFP 10 through the communication interface 85. The instruction information includes at least process information and a reply destination URL. The process information indicates a process to be executed by the MFP 10. The reply destination URL is a URL to which a result of the process by the MFP 10 is to be returned, i.e., a URL indicating the server 80.

In response to receiving the instruction information from the server 80, the MFP 10 interprets the received instruction information, and performs a process according to a result of the interpretation. Then, the MFP 10 transmits result information and reply information as a request via the HTTP communication, to the reply destination indicated by the reply destination URL contained in the instruction information. The result information is obtained as a result of the process performed by the MFP 10. The reply information includes identification information contained in the received instruction information.

In response to receiving the reply information from the MFP 10, the server 80 interprets the received reply information. The server 80 identifies which reply destination URL has been used for transmission of the reply information. Then, the server 80 selects a template corresponding to the identified reply destination URL from among a plurality of templates of the instruction information. Further, the server 80 performs a process to acquire content information to be contained in next instruction information, in accordance with the result information contained in the reply information. Further, the server 80 generates instruction information including the acquired content information, by editing the selected template. Then, the server 80 transmits, to the MFP 10, the generated instruction information as a response via the HTTP communication.

In response to receiving the new instruction information from the server 80, the MFP 10 performs a process according to process information contained in the received instruction information. Then, the MFP 10 transmits, to the server 80, new reply information as a request via the HTTP communication. The server 80 performs a process according to the new reply information, and transmits further new instruction information to the MFP 10. Thus, the coordinated operation is implemented by beginning with transmission of the coordinated-operation start information by the MFP 10 and repeatedly communicating the instruction information and the reply information.

Further, when the MFP 10 is in the coordinated-operation state, the control program 35 determines whether a state where there is no input operation via the operation interface 24 has continued for a particular period of time. When determining that the state where there is no input operation via the operation interface 24 has continued for the particular period of time, the control program 35 deletes the coordinated-operation information from the data storage area 32B, and controls the display 23 to display the standby screen. Namely, the MFP 10 is brought into the non-coordinated-operation state. In addition, when the MFP 10 is in the coordinated-operation state, the control program 35 determines whether a particular key (e.g., a key for issuing an instruction to return to the standby screen) of the operation interface 24 has been pressed. When determining that the particular key has been pressed, the control program 35 deletes the coordinated-operation information from the data storage area 32B, and controls the display 23 to display the standby screen.

For instance, the instruction information may be an XML (which is an abbreviated form of "Extensible Markup Language") file including at least one of display information, acquiring unit information, image processor information, and transmission instructing information. The display information indicates contents (e.g., texts and icons) on a screen to be displayed on the display 23. The acquiring unit information indicates an information acquiring unit (e.g., the operation interface 24, the Wi-Fi communication interface 25, and the NFC communication interface 26) for acquiring information or accepting operations. The image processor information indicates an image processor (e.g., the printer 11 and the image scanner 12) that performs image formation. The transmission instructing information indicates transmission of information via the HTTP communication. The display information, the acquiring unit information, the image processor information, and the transmission instructing information are examples of process information.

In response to receiving instruction information, the control program 35 of the MFP 10 interprets information contained in the instruction information. The control program 35 controls the display 23 of the MFP 10 to display a screen in accordance with the display information contained in the instruction information. The control program 35 sets valid an information acquiring unit indicated by the acquiring unit information contained in the instruction information. For instance, the control program 35 enables the NFC communication interface 26 to perform communication via the NFC link. Alternatively, the control program 35 may control the display 23 to display an icon for accepting a tapping operation. Then, the control program 35 acquires information or accepts an operation via the valid information acquiring unit. Further, after completely transmitting the information acquired in accordance with the instruction information to the server 80, the control program 35 sets the valid information acquiring unit invalid, in accordance with one or more definitions of the instruction information. Or, after completely acquiring the information defined in the instruction information, the control program 35 sets the valid information acquiring unit invalid, in accordance with one or more definitions of the instruction information.

The control program 35 controls an image processor (e.g., the printer 11 and the image scanner 12) indicated by the image processor information contained in the instruction information, to perform image formation. The transmission instructing information contains the reply destination URL that indicates a reply destination of information, and information-specifying information that specifies which information is to be transmitted. The control program 35 transmits information specified by the information-specifying information to a reply destination indicated by the reply destination URL, via the HTTP communication. Further, the instruction information containing display information may contain a serial number of the display information. In this case, the control program 35 may determine what serial number is contained in the instruction information, and may identify an information acquiring unit corresponding to the determined serial number. The control program 35 acquires information or accepts an operation via the identified information acquiring unit.

It is noted that a single piece of instruction information may contain a plurality of reply destination URLs. A single piece of instruction information may contain a plurality of pieces of process information, and a plurality of reply destination URLs that are associated with the plurality of pieces of process information, respectively. Further, the MFP 10 is allowed to receive, via the coordinated operation, a service provided by the service providing apparatus 110.

In the present disclosure, for the sake of explanatory convenience, the display information indicating contents on a screen (to be displayed on the display 23) may be described as the display information defining contents on the screen. Likewise, for the sake of explanatory convenience, the acquiring unit information indicating an information acquiring unit may be described as the acquiring unit information defining the information acquiring unit. Likewise, for the sake of explanatory convenience, the image processor information indicating an image processor may be described as the image processor information defining the image processor. Likewise, for the sake of explanatory convenience, the transmission instructing information providing an instruction to transmit information may be described as the transmission instructing information defining transmission of information.

Control of NFC Communication Interface and Coordinated Operation

The control program 35 is allowed to set the NFC communication interface 26 into states such as a receivable state, an un-receivable state, a transmittable state, and an un-transmittable state. In the receivable state, the NFC communication interface 26 is capable of receipt of information via near-field wireless communication (hereinafter referred to as "direct wireless reception"). In the un-receivable state, the NFC communication interface 26 is not capable of direct wireless reception. In the transmittable state, the NFC communication interface 26 is capable of transmission of information via near-field wireless communication (hereinafter referred to as "direct wireless transmission"). In the un-transmittable state, the NFC communication interface 26 is not capable of direct wireless transmission.

The "receivable state" is a state where, after establishing the NFC link, the NFC communication interface 26 is allowed to receive information via the NFC link. The "un-receivable state" is a state where the NFC communication interface 26 is not allowed to establish the NFC link, or a state where, even after establishing the NFC link, the NFC communication interface 26 is not allowed to receive information via the NFC link. The "transmittable state" is a state where, after establishing the NFC link, the NFC communication interface 26 is allowed to transmit information via the NFC link. The "un-transmittable state" is a state where the NFC communication interface 26 is not allowed to establish the NFC link, or a state where, even after establishing the NFC link, the NFC communication interface 26 is not allowed to transmit information via the NFC link.

The control program 35 may set the NFC communication interface 26 into the receivable state, by inputting into the NFC communication interface 26 a setting value representing permission to establish the NFC link. The control program 35 may set the NFC communication interface 26 into the receivable state, by turning on the NFC communication interface 26 and further inputting into the NFC communication interface 26 the setting value representing permission to establish the NFC link and a setting value representing permission to receive information via the NFC link. In the illustrative embodiment, in response to the setting value representing permission to establish the NFC link being input into the NFC communication interface 26, the NFC communication interface 26 performs the Poll operation.

When at least one of the setting values is previously stored in the NFC communication interface 26, the control program 35 may omit to input the at least one setting value, after turning on the NFC communication interface 26. Further, when the NFC communication interface 26 is previously powered on, or when the NFC communication interface 26 is automatically turned on to establish the NFC link, the control program 35 may omit to turn on the NFC communication interface 26.

The control program 35 may set the NFC communication interface 26 into the transmittable state, by turning on the NFC communication interface 26 and further inputting into the NFC communication interface 26 the setting value representing permission to establish the NFC link and a setting value representing permission to transmit information via the NFC link. When at least one of the setting values is previously stored in the NFC communication interface 26, the control program 35 may omit to input the at least one setting value, after turning on the NFC communication interface 26. Further, when the NFC communication interface 26 is previously powered on, or when the NFC communication interface 26 is automatically turned on to establish the NFC link, the control program 35 may omit to turn on the NFC communication interface 26.

The control program 35 may set the NFC communication interface 26 into the un-receivable state and the un-transmittable state, by turning off the NFC communication interface 26. The control program 35 may set the NFC communication interface 26 into the un-receivable state and the un-transmittable state, by inputting into the NFC communication interface 26 a setting value representing that establishment of the NFC link is not permitted. In the illustrative embodiment, the NFC communication interface 26 stops the Poll operation. Further, the control program 35 may set the NFC communication interface 26 into the un-receivable state, by inputting into the NFC communication interface 26 a setting value representing that reception of information via the NFC link is not permitted. The control program 35 may set the NFC communication interface 26 into the un-transmittable state, by inputting into the NFC communication interface 26 a setting value representing that transmission of information via the NFC link is not permitted.

When receiving ID information and print data via the Wi-Fi communication interface 25 in a state where the data storage area 32B stores therein a setting value for enabling a secure print function of the MFP 10, the control program 35 does not perform printing based on the received print data. Then, the control program 35 controls the storage 32 to store the received ID information and the received print data into the data storage area 32B in association with each other. Further, when receiving ID information via the NFC communication interface 26, the control program 35 determines whether the received ID information is stored in the data storage area 32B. When determining that the received ID information is stored in the data storage area 32B, the control program 35 reads out print data corresponding to the received ID information from the data storage area 32B, and performs printing based on the read print data.

Further, when receiving an SSID and a print instruction to perform printing based on print data in a state where the data storage area 32B stores therein a setting value for enabling a mobile print function of the MFP 10, the control program 35 establishes a Wi-Fi connection in accordance with the received SSID. Then, the control program 35 receives the print data specified by the print instruction, via Wi-Fi communication, and performs printing based on the print data.

Further, when receiving from the server 80 the instruction information that contains the acquiring unit information indicating the NFC communication interface 26 in a state where the MFP 10 is in the coordinated-operation state, the control program 35 transmits information acquired from one or more NFC devices via the NFC communication interface 26, to the server 80. Therefore, when acquiring information from the NFC devices via the NFC communication interface 26 in a state where the instruction information that contains the acquiring unit information indicating the NFC communication interface 26 has been received from the server 80, the control program 35 might not determine whether to use the acquired information in the secure print function or the mobile print function or whether to transmit the acquired information to the server 80 for the coordinated operation.

Therefore, in the present disclosure, the control program 35 determines whether the coordinated-operation information is stored in the data storage area 32B. When determining that the coordinated-operation information is not stored in the data storage area 32B, the control program 35 sets the NFC communication interface 26 into the receivable state. Then, when the data storage area 32B stores therein the setting value for enabling the secure print function or the mobile print function, the control program 35 executes the secure print function or the mobile print function using the information acquired from the NFC devices via the NFC communication interface 26. Further, when determining that the coordinated-operation information is not stored in the data storage area 32B, the control program 35 does not transmit the information acquired from the NFC devices, to the server 80.

Meanwhile, when determining that the coordinated-operation information is stored in the data storage area 32B, the control program 35 sets the NFC communication interface 26 into the un-receivable state. Nonetheless, when receiving from the server 80 the instruction information that contains the acquiring unit information indicating the NFC communication interface 26, the control program 35 sets the NFC communication interface 26 into the receivable state. Then, the control program 35 transmits the information acquired from the NFC devices via the NFC communication interface 26, to the sever 80 for the coordinated operation. More specifically, the control program 35 transmits the information acquired from the NFC devices via the NFC communication interface 26, to the reply destination indicated by the reply destination URL contained in the instruction information, i.e., to the server 80 as reply information for the coordinated operation.

Then, as the reply information is transmitted, it is considered that the process defined by the received instruction information has been completed. Thus, the control program 35 sets the NFC communication interface 26 into the un-receivable state. Alternatively, in response to acquiring the information from the NFC devices in accordance with the instruction information, the control program 35 may set the NFC communication interface 26 into the un-receivable state. Further, when determining that the coordinated-operation information is stored in the data storage area 32B, the control program 35 does not execute the secure print function or the mobile print function using the information acquired from the NFC devices via the NFC communication interface 26.

When the MFP 10 is in the non-coordinated-operation state, the control program 35 has not received the reply destination URL from the server 80. Therefore, the control program 35 is not allowed to transmit the reply information to the server 80. Further, even though the MFP 10 is in the coordinated-operation state, when the control program 35 has not received the instruction information from the server 80, the control program 35 does not have the reply destination URL. Therefore, the control program 35 is not allowed to transmit the reply information to the server 80. Meanwhile, when the control program 35 has received the instruction information from the server 80, the control program 35 has the reply destination URL. Thus, in this case, the control program 35 is allowed to transmit the reply information to the server 80. Hereinafter, a state where the MFP 10 has received the reply destination URL from the server 80 and is allowed to transmit the reply information to the server 80 will be referred to a "first mode" for the sake of explanatory convenience. Additionally, hereinafter, a state where the MFP 10 has not received the reply destination URL from the server 80 and is not allowed to transmit the reply information to the server 80 will be referred to a "second mode" for the sake of explanatory convenience.

Operations of Communication System

Referring to FIGS. 4 to 9, an explanation will be provided of operations of the communication system 100 in the illustrative embodiment.

FIG. 4 shows a preparation process to connect the MFP 10 with the service providing apparatus 110. Firstly, the control program 65 of the mobile terminal device 50 (more specifically, the CPU 61 executing the control program 65) controls the display 53 to display a service selecting screen (S11). FIG. 7A shows an example of the service selecting screen. As exemplified in FIG. 7A, the service selecting screen includes a [Service A] icon, a [Service B] icon, and a [Service C] icon. Then, the control program 65 enables the user interface 54 to accept a user operation to select one of the icons included in the service selecting screen.

Subsequently, for instance, the control program 65 accepts, via the user interface 54, a user operation of tapping a position of the [Service C] icon (S12). In response to accepting the selection of the [Service C] icon, the control program 65 transmits transmission request information to the server 80 via the mobile communication interface 55 (S13). The transmission request information is information for requesting the server 80 to transmit an R-token or a PIN. For instance, the transmission request information may contain a service ID and communication capability information. The service ID identifies a service corresponding to the selected icon. The communication capability information represents that the mobile terminal device 50 is capable of NFC communication. The selection of one of the icons included in the service selecting screen is an example of an input of an instruction to perform the preparation process.

Subsequently, the control program 95 of the server 80 (more specifically, the CPU 91 executing the control program 95) receives the transmission request information from the mobile terminal device 50 via the communication interface 85 (S13). In response to receiving the transmission request information, the control program 95 performs an R-token issuance process (S14). The R-token issuance process is a process in which the server 80 relays communication of the mobile terminal device 50 and the service providing apparatus 110, and thereby causes the service providing apparatus 110, which provides the service identified by the service ID, to issue an R-token. Specifically, in the R-token issuance process, the control program 95 acquires an account name and a password from the user via the mobile terminal device 50, and causes the service providing apparatus 110 to issue an R-token associated with the account name and the password.

Next, the control program 95 receives the R-token from the service providing apparatus 110 via the communication interface 85 (S15). In response to receiving the R-token, the control program 95 determines whether the sending source of the transmission request information is capable of NFC communication, based on the communication capability information contained in the transmission request information (S16).

Then, in response to determining that the sending source of the transmission request information is capable of NFC communication (S16: Yes), the control program 95 transmits the R-token to the mobile terminal device 50 via the communication interface 85 (S17). Namely, the control program 95 transmits, to the mobile terminal device 50, the R-token as a response to the transmission request information received from the mobile terminal device 50.

Further, the control program 65 of the mobile terminal device 50 receives the R-token from the server 80 via the mobile communication interface 55 (S17). The control program 65 stores the received R-token into the data storage area 62B (S18). The data storage area 62B is configured to store therein a plurality of R-tokens.

In the meantime, it is possible to achieve a process of S11 to S16 by the information processing terminal device 70, instead of the mobile terminal device 50. In this case, the transmission request information contains communication capability information representing that the information processing terminal device 70 is not capable of NFC communication. Then, in S16, the control program 95 of the server 80 determines that the sending source of the transmission request information is not capable of NFC communication (S16: No).

In this case, the control program 95 issues a PIN (S19), and transmit the issued PIN to the information processing terminal device 70 via the communication interface 85 (S20). Further, the control program 95 stores, into the data storage area 92B, the R-token received in S15 and the PIN issued in S19 in association with each other (S21). Namely, the control program 95 transmits, to the information processing terminal device 70, the PIN as a response to the transmission request information received from the information processing terminal device 70. Then, the information processing terminal device 70 receives the PIN from the server 80. The information processing terminal device 70 stores the received PIN into a storage thereof (S22).

FIGS. 5 and 6 show a service execution process for causing the MFP 10 to receive a service provided by the service providing apparatus 110, using the R-token stored in the mobile terminal device 50. It is noted that the MFP 10 sets the NFC communication interface 26 into the receivable state, before execution of a process shown in FIG. 5. The MFP 10 is in the second mode. Further, the mobile terminal device 50 sets the NFC communication interface 56 into the un-transmittable state, before execution of the process shown in FIG. 5.

Firstly, the control program 35 of the MFP 10 (more specifically, the CPU 31 executing the control program 35) controls the display 23 to display a main screen (S31). FIG. 7B shows an example of the main screen. As exemplified in FIG. 7B, the main screen includes a [Copy] icon, a [Scan] icon, and a [Web] icon. Then, the control program 35 enables the operation interface 24 to accept a user operation to select one of the icons included in the main screen.

Subsequently, the control program 35 accepts, via the operation interface 24, a user operation of tapping a position of the [Web] icon (S32). In response to accepting the selection of the [Web] icon, the control program 35 transmits communication request information to the server 80 via the Wi-Fi communication interface 25 (S33). Further, the control program 35 sets the NFC communication interface 26 into the receivable state. The communication request information requests the server 80 to perform data communication with the service providing apparatus 110.

Next, the control program 95 of the server 80 receives the communication request information from the MFP 10 via the communication interface 85 (S33). In response to receiving the communication request information, the control program 95 transmits acquisition instruction information to the MFP 10 via the communication interface 85 (S34). The acquisition instruction information instructs the MFP 10 to receive an R-token via the direct communication and accept a PIN via the operation interface 24. For instance, the acquisition instruction information includes an XML tag that defines a token accepting screen, an XML tag that instructs the MFP 10 to receive an R-token via the NFC communication interface 26, and an XML tag that instructs the MFP 10 to accept an entry of a PIN via the operation interface 24. The XML tags and information between the XML tags included in the acquisition instruction information are examples of content information.

Subsequently, the control program 35 of the MFP 10 receives the acquisition instruction information from the server 80 via the Wi-Fi communication interface 25 (S34). The control program 35 controls the display 23 to display a token accepting screen defined by the received acquisition instruction information (S35). Further, the control program 35 sets the NFC communication interface 26 into the receivable state. The MFP 10 comes into the first mode. Thereby, the NFC communication interface 26 repeatedly transmits a polling signal at intervals of a predetermined period of time (S36).

FIG. 8A shows an example of the token accepting screen. As exemplified in FIG. 8A, the token accepting screen includes a message "Please hold your mobile terminal device over the MFP, or enter the PIN," a textbox for displaying a PIN input via the operation interface 24, and an [OK] icon. Then, the control program 35 enables the NFC communication interface 26 to receive an R-token and enables the operation interface 24 to accept a user operation of entering a PIN.

Further, the control program 65 of the mobile terminal device 50 controls the display 53 to display a token selecting screen (S37). FIG. 8B shows an example of the token selecting screen. As exemplified in FIG. 8B, the token selecting screen includes a plurality of token icons. Each of the token icons is associated with a corresponding one of the R-tokens stored in the data storage area 62B. For instance, an [(A) User A] icon is associated with an R-token issued for a user A of a service A. Further, a [(C) User A] icon is associated with an R-token issued for the user A of a service C. Each token icon is an example of an authentication information object that represents a corresponding R-token. Then, the control program 65 enables the user interface 54 to accept a user operation to select one of the token icons.

Subsequently, the control program 65 accepts, via the user interface 54, a user operation of tapping a position of one of the token icons (S38). In response to accepting the selection of the token icon, the control program 65 controls the display 53 to display a near-field instruction screen (S39). FIG. 9A shows an example of the near-field instruction screen. As exemplified in FIG. 9A, the near-field instruction screen includes a message "Please hold this mobile terminal device over the MFP," and a message "Now monitoring polling signals." Further, the control program 65 sets the NFC communication interface 56 into the transmittable state.

Next, as shown in FIG. 6, in response to the mobile terminal device 50 being brought within a range communicable with the MFP 10 via NFC communication, an NFC link is established between the MFP 10 and the mobile terminal device 50 (S41). Then, the control program 65 of the mobile terminal device transmits an R-token corresponding to the selected token icon, to the MFP 10 via the NFC communication interface 56 (S42). Further, the control program 65 sets the NFC communication interface 56 into the un-transmittable state.

Further, the control program 35 of the MFP 10 receives the R-token from the mobile terminal device 50 via the NFC communication interface 26 (S42). In addition, the control program 35 transmits the R-token received in S42 and apparatus type information, to the server 80 via the Wi-Fi communication interface 25 (S43). Moreover, the control program 35 sets the NFC communication interface 26 into the un-receivable state. The apparatus type information is information for identifying a type of the MFP 10. The apparatus type information may be a model name of the MFP 10.

Subsequently, the control program 95 of the server 80 receives the R-token and the apparatus type information from the MFP 10 via the communication interface 85 (S43). The control program 95 determines whether the MFP 10 of a type identified by the received apparatus type information is allowed to perform data communication with the service providing apparatus 110 as an issuance source of the received R-token (S44). In other words, the control program 95 determines whether the MFP 10 of the type identified by the received apparatus type information is allowed to receive services provided by the service providing apparatus 110 as the issuance source of the received R-token (S44). The process of S44 is an example of a determining process.

For instance, in S44, the server 80 may determine whether a model name indicated by the apparatus type information is on a list of model names of MFPs 10 that are allowed to receive services provided by the service providing apparatus 110. For instance, the list of model names may be stored in the data storage area 92B, or may be acquired from another server on the Internet 101. The same applies to a below-mentioned determining process (S53) by the mobile terminal device 50.

Then, in response to determining that the MFP 10 of the type identified by the received apparatus type information is not allowed to perform data communication with the service providing apparatus 110 as the issuance source of the received R-token (S44: No), the control program 95 transmits error information to the MFP 10 via the communication interface 85 (S45). The error information represents that the MFP 10 of the identified type is not allowed to perform data communication with the service providing apparatus 110. Further, although it is not shown in any drawings, the control program 35 of the MFP 10 receives the error information from the server 80 via the Wi-Fi communication interface 25 (S45). Then, the control program 35 controls the display 23 to display the contents of the received error information. After that, when the MFP 10 comes into a non-access state where the MFP 10 does not access any apparatuses or devices and is not accessed by any apparatuses or devices, the control program 35 sets the NFC communication interface 26 into the receivable state. The MFP 10 comes into the second mode.

Meanwhile, in response to determining that the MFP 10 of the type identified by the received apparatus type information is allowed to perform data communication with the service providing apparatus 110 as the issuance source of the received R-token (S44: Yes), the control program 95 of the server 80 transmits the R-token received in S43, to the service providing apparatus 110 via the communication interface 85 (S46). Then, the control program 95 receives an access token (hereinafter referred to as an "A-token") issued by the service providing apparatus 110 in association with the R-token, from the service providing apparatus 110 via the communication interface 85 (S47).

It is noted that, for instance, an R-token is issued in association with an account name, and is usable any number of times within a term of validity. Meanwhile, for instance, an A-token is an example of one-time authentication information that is updated each time the MFP 10 performs data communication with the service providing apparatus 110 and is discarded after completion of the data communication. Namely, the A-token has a shorter term of validity than the R-token. Further, the A-token is discarded after use of it, while the R-token remains stored in the MFP 10 or the mobile terminal device 50 even after use of it.

Subsequently, the control program 95 transmits communication instruction information to the MFP 10 via the communication interface 85 (S48). The communication instruction information indicates a method for data communication with the service providing apparatus 110. The communication instruction information includes the A-token that the server 80 has received in S47. Further, the communication instruction information may include location information that indicates a location of the service providing apparatus 110 to be accessed by the MFP 10. For instance, the location information may be expressed in a format of URL (which is an abbreviated form of "Uniform Resource Location"). Various kinds of information contained in the communication instruction information are examples of content information.

Next, the control program 35 of the MFP 10 receives the communication instruction information from the server 80 via the Wi-Fi communication interface 25 (S48). The control program 35 performs data communication according to the received communication instruction information, with the service providing apparatus 110 via the Wi-Fi communication interface 25 (S49). Thereafter, when the MFP 10 comes into the non-access state, the control program 35 sets the NFC communication interface 26 into the receivable state. The MFP 10 comes into the second mode. Although the data communication in S49 is not limited to a specific example, various processes may be cited as the data communication in S49, such as an upload process to store data into the service providing apparatus 110, and a download process to receive data stored in the service providing apparatus 110.

For instance, the control program 35, which executes the upload process, may transmit data and the A-token to the upload destination indicated by the location information, via the Wi-Fi communication interface 25. In this case, the service providing apparatus 110 receives the data and the A-token from the MFP 10. The service providing apparatus 110 authenticates the received A-token. Then, in response to successfully authenticating the received A-token, the service providing apparatus 110 stores the received data into its storage. Meanwhile, in response to failing in the authentication of the A-token, the service providing apparatus 110 discards the received data and transmits error information to the MFP 10. It is noted that, for instance, uploaded data may be image data generated by the image scanner 12 in a scanning process.

Further, for instance, the control program 35, which executes the download process, may transmit the A-token and the location information to the service providing apparatus 110 via the Wi-Fi communication interface 25. In this case, the service providing apparatus 110 receives the A-token and the location information. The service providing apparatus 110 authenticates the received A-token. Then, in response to successfully authenticating the received A-token, the service providing apparatus 110 transmits data indicated by the received location information, to the MFP 10. Meanwhile, in response to failing in the authentication of the A-token, the service providing apparatus 110 transmits error information to the MFP 10. Further, the control program 35 of the MFP 10 receives the data from the service providing apparatus 110 via the Wi-Fi communication interface 25. For instance, the downloaded data may be used for a recording process by the printer 11 of the MFP 10.

In the upload process and the download process, for instance, the service providing apparatus 110 may determine that the authentication has successfully been performed when an A-token coincident with the received A-token is stored in the storage of the service providing apparatus 110. Meanwhile, the service providing apparatus 110 may determine that the authentication has failed in the authentication when an A-token coincident with the received A-token is not stored in the storage of the service providing apparatus 110.

Operations and Advantageous Effects of Illustrative Embodiment

According to the aforementioned illustrative embodiment, when the mobile terminal device 50 that stores therein one or more R-tokens is brought within a range communicable with the MFP 10 via NFC communication, data communication becomes available between the MFP 10 and the service providing apparatus 110. Therefore, it is possible to simplify user operations for performing data communication between the MFP 10 and the service providing apparatus 110. Further, the MFP 10 may be configured to acquire an R-token from the mobile terminal device 50 each time the MFP 10 performs data communication with the service providing apparatus 110. Consequently, there is no need for storing any R-tokens in the MFP 10. Thus, it is possible to avoid security risks that might be caused when the MFP 10 is used in common or stolen.

In the aforementioned illustrative embodiment, an example has been described in which the MFP 10 acquires an A-token using an R-token, and performs data communication with the service providing apparatus 110 using the A-token. Nonetheless, the method for data communication with the service providing apparatus 110 is not limited to the example. For instance, the MFP 10 may perform data communication with the service providing apparatus 110 using the R-token. Namely, the steps S46 and S47 shown in FIG. 6 may be omitted. Further, the steps S43 to S48 may be omitted.

In the aforementioned illustrative embodiment, an example has been described in which both the state of the NFC communication interface 26 and the mode of the MFP 10 are switched in the process shown in FIGS. 5 and 6. Nonetheless, the NFC communication interface 26 may always be in the receivable state, and the mode of the MFP 10 may only be switched. For instance, the MFP 10 in the second mode may come into the first mode in response to receiving the acquisition instruction information from the server 80. Further, the MFP 10 may come into the second mode in response to transmitting the R-token to the server 80.

Alternatively, the control program 35 may operate the NFC communication interface 26 in the P2P mode. In this case, the receivable state may be a state where both of the direct wireless transmission and the direct wireless reception are allowed. Meanwhile, the un-receivable state may be a state where the direct wireless transmission is allowed, and the direct wireless reception is restricted. Furthermore, the control program 35 may operate the NFC communication interface 26 in the CE mode. For instance, the receivable state of the NFC communication interface 26 that operates in the CE mode may be a state where the NFC communication interface 26 is performing the "Listen" operation. Additionally, for instance, the un-receivable state of the NFC communication interface 26 that operates in the CE mode may be a state where the NFC communication interface 26 stops the "Listen" operation.

Further, the method for transmitting the R-token from the mobile terminal device 50 to the MFP 10 is not limited to NFC communication. For instance, the MFP 10 and the mobile terminal device 50 may communicate therebetween information (e.g., SSIDs) necessary for establishment of a Wi-Fi direct connection, via NFC communication. Then, the mobile terminal device 50 may establish a Wi-Fi direct connection with the MFP 10, using the necessary information. Further, the mobile terminal device 50 may transmit the R-token to the MFP 10 via the established Wi-Fi direct connection. Namely, NFC communication may be used for at least a part of a procedure for communicating the R-token between the MFP 10 and the mobile terminal device 50.

Further, according to the aforementioned illustrative embodiment, there is no need for implementing, into the MFP 10, a determining process of determining whether the MFP 10 has a function to perform data communication with the service providing apparatus 110. In general, it is relatively difficult to add a new process into the MFP 10 in comparison with when a new process is implemented into the server 80. Hence, by causing the server 80 to determine whether the MFP 10 has a function to perform data communication with the service providing apparatus 110, in an attempt to connect the MFP 10 with a new service providing apparatus 110, it is possible to properly determine whether the MFP 10 is allowed to perform data communication with the new service providing apparatus 110. It is noted that the server 80 may not necessarily perform the determining process (S44). As will be described in a below-mentioned first modification, the mobile terminal device 50 may perform a determining process (S53).

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

First Modification

Subsequently, referring to FIG. 10, a service execution process of a first modification will be described. It is noted that, regarding the same elements and features as exemplified in the aforementioned illustrative embodiment, a redundant explanation of them will be omitted. Differences from the aforementioned illustrative embodiment will mainly be described. The process described with reference to FIG. 5 may be applied to the first modification. The first modification is different from the aforementioned illustrative embodiment in that, in the first modification, the mobile terminal device 50 determines whether data communication is available between the MFP 10 and the service providing apparatus 110.

Before execution of the process shown in FIG. 10, the NFC communication interface 26 is in the receivable state and the transmittable state, and the MFP 10 is in the first mode. In addition, the NFC communication interface 56 is in the receivable state and the transmittable state.

Firstly, in response to an NFC link being established between the MFP 10 and the mobile terminal device 50 (S51), the control program 35 of the MFP 10 transmits apparatus type information to the mobile terminal device 50 via the NFC communication interface 26 (S52). Further, the control program 65 of the mobile terminal device 50 receives the apparatus type information from the MFP 10 via the NFC communication interface 56 (S52). The control program 65 determines whether the MFP 10 of an apparatus type identified by the received apparatus type information is allowed to perform data communication with the service providing apparatus 110 as an issuance source of an R-token corresponding to the selected token icon (S53). The process of S53 is another example of the determining process.

Then, in response to determining that the MFP 10 of the apparatus type identified by the received apparatus type information is not allowed to perform data communication with the service providing apparatus 110 as the issuance source of the R-token corresponding to the selected token icon (S53: No), the control program 65 transmits error information to the MFP 10 via the NFC communication interface 56 (S54). The error information represents that the MFP 10 of the identified apparatus type is not allowed to perform data communication with the service providing apparatus 110. Then, the control program 65 sets the NFC communication interface 56 into the un-receivable state and the un-transmittable state. Further, the control program 35 of the MFP 10 receives the error information from the mobile terminal device 50 via the NFC communication interface 26 (S54). The control program 35 controls the display 23 to display contents of the received error information. Thereafter, when the MFP 10 comes into the non-access state, the control program 35 sets the NFC communication interface 26 into the receivable state and the transmittable state. The MFP 10 comes into the second mode.

Meanwhile, in response to determining that the MFP 10 of the apparatus type identified by the received apparatus type information is allowed to perform data communication with the service providing apparatus 110 as the issuance source of the R-token corresponding to the selected token icon (S53: Yes), the control program 65 transmits the R-token corresponding to the selected token icon to the MFP 10 via the NFC communication interface 56 (S55). Then, the control program 35 transmits the received R-token to the server 80 via the Wi-Fi communication interface 25 (S56). Further, the control program 35 sets the NFC communication interface 26 into the un-receivable state and the un-transmittable state.

It is noted that S56 shown in FIG. 10 is different from S43 shown in FIG. 6 since the apparatus type information is not transmitted in S56. The process of S57 to S60 shown in FIG. 10 is substantially the same as the process of S46 to S49 shown in FIG. 6.

According to the first modification, there is no need for the MFP 10 to determine whether the MFP 10 has a function to perform data communication with the service providing apparatus 110. In this respect, the first modification is different from the aforementioned illustrative embodiment. Consequently, according to the first modification, in an attempt to connect the MFP 10 with a new service providing apparatus 110, it is possible to properly determine whether the MFP 10 is allowed to perform data communication with the new service providing apparatus 110.

In the first modification, an example has been described in which in response to receipt of the acquisition instruction information including the XML tag that instructs the MFP 10 to receive the R-token via the NFC communication interface 26 in S34 shown in FIG. 5, the MFP 10 performs the process of S51 to S56. Nonetheless, more specifically, the acquisition instruction information received in S34 may include an XML tag that instructs the MFP 10 to transmit the apparatus type information via the NFC communication interface 26, and an XML tag that instructs the MFP 10 to receive the error information or the R-token via the NFC communication interface 26.

Alternatively, the MFP 10 may receive, from the server 80, transmission instruction information that instructs the MFP 10 to transmit the apparatus type information via the NFC communication interface 26. Next, the MFP 10 may perform the process of S51 in accordance with the received transmission instruction information. Subsequently, the MFP 10 may provide to the server 80 a notification that the MFP 10 has completely transmitted the apparatus type information in accordance with the transmission instruction information. Subsequently, the MFP 10 may receive, from the server 80, acquisition instruction information that instructs the MFP 10 to receive the error information or the R-token via the NFC communication interface 26. Then, the MFP 10 may perform the process of S53 and the following steps in accordance with the received acquisition instruction information.

Second Modification

Subsequently, referring to FIG. 11, a service execution process of a second modification will be described. Regarding substantially the same features and elements as exemplified in the aforementioned illustrative embodiment, a redundant explanation of them will be omitted. Differences from the aforementioned illustrative embodiment will mainly be described. The process described with reference to FIG. 5 may be applied to the second modification. The second modification is different from the aforementioned illustrative embodiment and the first modification in that, in the second modification, a PIN is transmitted from the mobile terminal device 50 to the MFP 10 via NFC communication.

Specifically, in the process shown in FIG. 4, the control program 95 of the server 80 issues a PIN, regardless of whether the sending source of the transmission request information is capable of NFC communication. In addition, the control program 95 transmits the issued PIN to the mobile terminal device 50 via the communication interface 85. Further, the control program 95 stores, into the data storage area 92B, the R-token received from the service providing apparatus 110 and the issued PIN in association with each other.

Further, in the process shown in FIG. 4, the control program 65 of the mobile terminal device 50 receives the PIN from the server 80 via the mobile communication interface 55. The control program 65 stores the received PIN into the data storage area 62B. Moreover, the token icons shown in FIG. 8B are associated with PINs stored in the data storage area 62B.

Further, before execution of the process shown in FIG. 11, the NFC communication interface 26 is in the receivable state and the transmittable state, and the MFP 10 is in the first mode. In addition, the NFC communication interface 56 is in the receivable state and the transmittable state. Then, in response to an NFC link being established between the MFP 10 and the mobile terminal device 50 (S61), the control program 65 transmits a PIN corresponding to the selected token icon, to the MFP 10 via the NFC communication interface 56 (S62).

Next, the control program 35 of the MFP 10 receives the PIN from the mobile terminal device 50 via the NFC communication interface 26 (S62). The control program 35 transmits the received PIN to the server 80 via the Wi-Fi communication interface 25 (S63). Further, the control program 35 sets the NFC communication interface 26 into the un-receivable state and the un-transmittable state.

Subsequently, the control program 95 of the server 80 receives the PIN from the MFP 10 via the communication interface 85 (S63). The control program 95 determines whether an R-token associated with the received PIN is stored in the data storage area 92B (S64). The process of S64 is another example of the determining process.

In response to determining that an R-token associated with the received PIN is not stored in the data storage area 92B (S64: No), the control program 95 transmits error information to the MFP 10 via the communication interface 85 (S65). The error information represents that the MFP 10 is not allowed to perform data communication with the service providing apparatus 110. Further, the control program 35 of the MFP 10 receives the error information from the server 80 via the NFC communication interface 26 (S65). Thereafter, the control program 35 controls the display 23 to display contents of the received error information. Then, after the MFP 10 comes into the non-access state, the control program 35 sets the NFC communication interface 26 into the receivable state and the transmittable state. The MFP 10 comes into the second mode.

Meanwhile, in response to determining that an R-token associated with the received PIN is stored in the data storage area 92B (S64: Yes), the control program 95 transmits the R-token to the MFP 10 via the communication interface 85 (S66).

Subsequently, the control program 35 of the MFP 10 receives the R-token and transmission instruction information of the R-token, from the server 80 via the Wi-Fi communication interface 25 (S66). The transmission instruction information of the R-token includes, for instance, an XML tag that instructs the MFP 10 to transmit the R-token to the mobile terminal device 50 via the NFC communication interface 26, and an XML tag that instructs the MFP 10 to transmit the R-token to the server 80 via the Wi-Fi communication interface 25. The XML tags and information between the XML tags included in the transmission instruction information are examples of content information. Further, the control program 35 sets the NFC communication interface 26 into the receivable state and the transmittable state.

The control program 35 transmits the received R-token to the mobile terminal device 50 via the NFC communication interface 26 (S67). Further, the communication system 100 performs the process of S56 to S60, using the R-token received by the MFP 10 in S66. Then, after the MFP 10 comes into the non-access state, the control program 35 sets the NFC communication interface 26 into the receivable state and the transmittable state. The MFP 10 comes into the second mode.

The control program 65 of the mobile terminal device 50 receives the R-token from the MFP 10 (S67). The control program 65 stores the received R-token into the data storage area 62B (S68). Further, the control program 65 sets the NFC communication interface 56 into the un-receivable state and the un-transmittable state. After establishment of the NFC link between the MFP 10 and the mobile terminal device 50, the NFC link may be maintained until the R-token is transmitted from the MFP 10 to the mobile terminal device 50 in S67. Alternatively, the NFC link may be broken after the PIN is transmitted from the mobile terminal device 50 to the MFP 10 in S62, and may be reestablished before the R-token is transmitted from the MFP 10 to the mobile terminal device 50 in S67.

According to the second modification, in response to the mobile terminal device 50 storing the PIN therein being brought within a range communicable with the MFP 10 via NFC communication, data communication becomes available between the MFP 10 and the service providing apparatus 110. Thus, it is possible to simplify user operations for performing data communication between the MFP 10 and the service providing apparatus 110. Further, it is possible to use a known server 80 configured to transmit a PIN issued in association with an R-token, and therefore to reduce a cost for developing the server 80.

Further, according to the second modification, in each data communication after the first data communication that the MFP 10 performs with the service providing apparatus 110, it is possible to skip (omit) the steps S63 to S66. Nonetheless, the steps S67 and S68 shown in FIG. 11 may be omitted. Namely, the MFP 10 may receive the PIN from the mobile terminal device 50 each time the MFP 10 performs data communication with the service providing apparatus 110. Alternatively, instead of the steps S67 and S68, a process of S77 shown in FIG. 12 may be executed.

Further, in S66, the MFP 10 may receive first transmission instruction information from the server 80. The first transmission instruction information instructs the MFP 10 to transmit the R-token via the NFC communication interface 26. Next, the MFP 10 may perform the process of S67 in accordance with the received first transmission instruction information. Subsequently, the MFP 10 may provide to the server 80 a notification that the MFP 10 has completely transmitted the R-token in accordance with the first transmission instruction information. Next, the MFP 10 may receive second transmission instruction information from the server 80. The second transmission instruction information instructs the MFP 10 to transmit the R-token via the Wi-Fi communication interface 25. Then, the MFP 10 may perform the process of S56 and the following steps in accordance with the received second transmission instruction information.

Third Modification

Subsequently, referring to FIGS. 12 and 13, a service execution process of a third modification will be described. Regarding substantially the same features and elements as exemplified in the aforementioned illustrative embodiment, a redundant explanation of them will be omitted. Differences from the aforementioned illustrative embodiment will mainly be described. The process of S31 to S35 shown in FIG. 5 may be applied to the third modification. The third modification is different from the aforementioned illustrative embodiment and the first and second modifications in that, in the third modification, instead of the mobile terminal device 50, the information processing terminal device 70 is used.

The information processing terminal device 70 displays, on the display thereof, the PIN stored in the storage thereof in S22 shown in FIG. 4 (S71). Then, the user who saw the PIN displayed on the display of the information processing terminal device 70 is allowed to input the PIN by operating the operation interface 24, in a state where the token accepting screen as exemplified in FIG. 8A is being displayed on the display 23 of the MFP 10. Namely, the control program 35 of the MFP 10 accepts a user operation to input the PIN via the operation interface 24 (S72).

Next, the control program 35 transmits the PIN to the server 80 via the Wi-Fi communication interface 25 (S73). The process of S73 to S76 is substantially the same as the process of S63 to S66 shown in FIG. 11. Then, the control program 35 receives the R-token from the server 80 via the Wi-Fi communication interface 25. Further, the control program 35 stores the received R-token into the data storage area 32B (S77). Moreover, the communication system 100 performs the process of S56 to S60, using the R-token received by the MFP 10 in S76.

Further, according to the third modification, in S33 shown in FIG. 5, the control program 35 transmits, to the server 80, the communication request information that includes information for identifying R-tokens stored in the data storage area 32B. Consequently, the control program 35 of the MFP 10, which holds the R-tokens stored in the data storage area 32B thereof, controls the display 23 to display a token accepting screen shown in FIG. 9B, instead of the token accepting screen shown in FIG. 8A, in accordance with the acquisition instruction information (S81).

As exemplified in FIG. 9B, the token accepting screen includes a message "Please hold your mobile terminal device over the MFP, or select one of the tokens," and token icons. The tokens icons are associated with the R-tokens stored in the data storage area 32B. Then, the control program 35 enables the NFC communication interface 26 to receive an R-token, and enables the operation interface 24 to accept a user operation to select one of the token icons. Each token icon is an example of the authentication information object.

Then, the control program 35 accepts, via the operation interface 24, a user operation of tapping a position of one of the token icons (S82). In response to accepting the selection of one of the token icons, the control program 35 transmits an R-token stored in the data storage area 32B in association with the selected token icon, to the server 80 via the Wi-Fi communication interface 25 (S83). Further, the communication system 100 performs the process of S57 to S60, using the R-token associated with the selected token icon.

According to the third modification, even though a user only has an information processing terminal device 70 without an NFC communication function, the user is allowed to cause the MFP 10 and the service providing apparatus 110 to perform data communication therebetween in a known method. Namely, according to aspects of the present disclosure, the third modification may not independently be implemented, but may be implemented in combination with at least one of the aforementioned illustrative embodiment and the first and second modifications.

In the aforementioned illustrative embodiment and the first to third modifications, each of the aforementioned processes by the MFP 10 is implemented when the CPU 31 executes the control program 35 stored in the program storage area 32A of the storage 32. Likewise, each of the aforementioned processes by the mobile terminal device 50 is implemented when the CPU 61 executes the control program 65 stored in the program storage area 62A of the storage 62. Further, each of the aforementioned processes by the server 80 is implemented when the CPU 91 executes the control program 95 stored in the program storage area 92A of the storage 92. Nonetheless, regarding the processes by each of the MFP 10, the mobile terminal device 50, and the server 80, a part or all of them may be implemented by hardware such as one or more integrated circuits.

Further, aspects of the present disclosure achieved as the MFP 10, the mobile terminal device 50, and the server 80 may be achieved as programs that cause the MFP 10, the mobile terminal device 50, and the server 80 to perform the processes. The programs may be provided as being stored in non-transitory computer-readable media including but not limited to RAMs, ROMs, flash memories, EEPROMs, CD-media, DVD-media, hard disk drives, floppy drives, and storage coupled with a server that is connectable with the MFP 10, the mobile terminal device 50, and the server 80 via a communication network. The programs may be delivered as information or signals indicating the programs, via the communication network such as the Internet.

What is claimed is:

1. A communication system configured to perform data communication with a service providing apparatus on an Internet, the communication system comprising:
   an image processing apparatus:
   a server on the Internet; and
   an information processing terminal device comprising:
      a terminal-side storage;
      a first network interface;
      a user interface; and
      a first controller configured to:
         accept, via the user interface, an instruction to perform a preparation process to connect the image processing apparatus with the service providing apparatus;
         in response to accepting the instruction to perform the preparation process via the user interface, transmit transmission request information via the first network interface, the transmission request information being for requesting transmission of authentication information, the authentication information representing authorization to perform data communication with the service providing apparatus;
   wherein the image processing apparatus comprises:
      an image processor;
      a second network interface;
      an operation interface; and
      a second controller configured to:
         accept, via the operation interface, an instruction to perform data communication with the service providing apparatus;
         in response to accepting the instruction to perform data communication with the service providing apparatus, transmit communication request information to the server via the second network interface, the communication request information being for requesting the server to perform data communication with the service providing apparatus;
         receive acquisition instruction information from the server via the second network interface, the acquisition instruction information being for instructing the image processing apparatus to receive the authentication information; and
         perform data communication with the service providing apparatus via the second network interface, and
   wherein the server comprises:
      a third network interface configured to communicate with an external device via the Internet; and
      a third controller configured to:
         in response to receiving the communication request information from the image processing apparatus via the third network interface, transmit the acquisition instruction information to the image processing apparatus via the third network interface.

2. The communication system according to claim 1, wherein the first network interface comprises:
   a first communication interface configured to communicate with the server via the Internet; and
   a first near-field communication interface configured to perform near-field wireless communication with the image processing apparatus, using a near-field wireless communication protocol,
   wherein the first controller is further configured to:
      in response to accepting the instruction to perform the preparation process via the user interface, transmit the transmission request information to the server via the first communication interface;
      receive the authentication information from the server via the first communication interface; and
      transmit the authentication information stored in the terminal-side storage, to the image processing apparatus via the first near-field communication interface,
   wherein the second network interface comprises:
      a second communication interface configured to communicate with at least one of the server and the service providing apparatus via the Internet; and
      a second near-field communication interface configured to perform near-field wireless communication with the information processing terminal device, using a near-field wireless communication protocol, and
   wherein the second controller is further configured to:
      in response to accepting the instruction to perform data communication with the service providing apparatus, transmit the communication request information to the server via the second communication interface;
      receive the acquisition instruction information from the server via the second communication interface;
      in response to receiving the acquisition instruction information from the server via the second communication interface, set the second near-field communication interface into a receivable state where the second near-field communication interface is allowed to receive the authentication information from the information processing terminal device;
      receive the authentication information from the information processing terminal device via the second near-field communication interface;
      transmit the received authentication information to the server via the second communication interface;
      receive communication instruction information from the server via the second communication interface, the communication instruction information indicating a method for data communication with the service providing apparatus; and
      in response to receiving the communication instruction information from the server via the apparatus-side communication interface, perform data communication with the service providing apparatus via the second communication interface in accordance with the received communication instruction information.

3. The communication system according to claim 2, wherein the image processing apparatus further comprises:
   a display; and
   an apparatus-side storage configured to store the authentication information,
   wherein the third controller is further configured to transmit the acquisition instruction information to the image processing apparatus via the third network interface, the acquisition instruction information being for instructing the image processing apparatus to receive the authentication information via the second near-field communication interface and to accept via the operation interface a selection of the authentication information stored in the apparatus-side storage, and
   wherein the second controller is further configured to:

when setting the second near-field communication interface into the receivable state, control the display to display an authentication information object representing the authentication information stored in the apparatus-side storage, and enable the operation interface to accept a selection of the authentication information object on the display; and in response to accepting the selection of the authentication information object via the operation interface, transmit the authentication information corresponding to the selected authentication information object, to the server via the second communication interface.

4. The communication system according to claim 2, wherein the second controller is further configured to, after setting the second near-field communication interface into the receivable state, repeatedly transmit a polling signal via the second near-field communication interface, and wherein the first controller is further configured to, in response to receiving the polling signal via the first near-field communication interface, transmit the authentication information stored in the terminal-side storage, to the image processing apparatus via the first near-field communication interface.

5. The communication system according to claim 2, wherein the information processing terminal device further comprises a display, wherein the terminal-side storage stores therein a plurality of pieces of authentication information, and wherein the first controller is further configured to:

control the display to display a plurality of authentication information objects, each authentication information object representing a corresponding one of the plurality of pieces of authentication information stored in the terminal-side storage;

enable the user interface to accept a selection of the authentication information objects; and in response to accepting the selection of one of the authentication information objects via the user interface, transmit authentication information corresponding to the selected authentication information object, to the image processing apparatus via the first near-field communication interface.

6. The communication system according to claim 2, wherein the second controller is further configured to, when transmitting the authentication information to the server, transmit apparatus type information along with the authentication information, to the server via the second communication interface, the apparatus type information being for identifying a type of the image processing apparatus, and wherein the third controller is further configured to:

in response to receiving the authentication information and the apparatus type information from the image processing apparatus via the third network interface, determine whether the image processing apparatus of the type identified by the received apparatus type information is allowed to perform data communication with the service providing apparatus;

in response to determining that the image processing apparatus of the identified type is allowed to perform data communication with the service providing apparatus, transmit the communication instruction information to the image processing apparatus via the third network interface; and in response to determining that the image processing apparatus of the identified type is not allowed to perform data communication with the service providing apparatus, transmit error information to the image processing apparatus via the third network interface, the error information representing that the image processing apparatus of the identified type is not allowed to perform data communication with the service providing apparatus.

7. The communication system according to claim 2, wherein the second controller is further configured to, in response to a near-field wireless connection being established between the image processing apparatus and the information processing terminal device, transmit apparatus type information to the information processing terminal device via the second near-field communication interface, the apparatus type information being for identifying a type of the image processing apparatus, wherein the first controller is further configured to:

in response to receiving the apparatus type information from the image processing apparatus via the first near-field communication interface, determine whether the image processing apparatus of the type identified by the received apparatus type information is allowed to perform data communication with the service providing apparatus;

in response to determining that the image processing apparatus of the identified type is allowed to perform data communication with the service providing apparatus, transmit the authentication information stored in the terminal-side storage, to the image processing apparatus via the first near-field communication interface; and in response to determining that the image processing apparatus of the identified type is not allowed to perform data communication with the service providing apparatus, transmit error information to the image processing apparatus via the first near-field communication interface, the error information representing that the image processing apparatus of the identified type is not allowed to perform data communication with the service providing apparatus.

8. The communication system according to claim 2, wherein the third controller is further configured to:

in response to receiving the transmission request information from the information processing terminal device via the third network interface, receive the authentication information issued by the service providing apparatus, from the service providing apparatus via the third network interface; and transmit the received authentication information to the information processing terminal device via the third network interface.

9. The communication system according to claim 8, wherein the authentication information comprises:

master authentication information; and one-time authentication information that is updated each time the image processing apparatus performs data communication with the service providing apparatus, and wherein the third controller is further configured to:

in response to receiving the master authentication information from the image processing apparatus via the third network interface, acquire the one-time authentication information from the service providing apparatus, using the master authentication information; and transmit the communication instruction information including the acquired one-time authentication information, to the image processing apparatus via the third network interface.

10. The communication system according to claim 2, wherein the authentication information comprises:
first authentication information issued by the service providing apparatus; and
second authentication information issued by the server, wherein the server further comprises a server-side storage, and
wherein the third controller is further configured to:
in response to receiving the transmission request information from the information processing terminal device via the third network interface, receive the first authentication information from the service providing apparatus via the third network interface;
issue the second authentication information;
transmit the second authentication information to the information processing terminal device via the third network interface; and
store, into the server-side storage, the first authentication information and the second authentication information in association with each other.

11. The communication system according to claim 10, wherein the third controller is further configured to:
in response to receiving the second authentication information from the image processing apparatus via the third network interface, determine whether the first authentication information associated with the received second authentication information is stored in the server-side storage;
in response to determining that the first authentication information associated with the received second authentication information is stored in the server-side storage, transmit the first authentication information to the image processing apparatus via the third network interface; and
in response to determining that the first authentication information associated with the received second authentication information is not stored in the server-side storage, transmit error information to the image processing apparatus via the third network interface, the error information representing that the image processing apparatus is not allowed to perform data communication with the service providing apparatus.

12. The communication system according to claim 11, further comprising a second information processing terminal device that is different from the information processing terminal device as a first information processing terminal device, the second information processing terminal device being incapable of near-field wireless communication,
wherein the third controller is configured to:
in response to receiving the transmission request information from the first information processing terminal device via the third network interface, transmit the first authentication information to the first information processing terminal device via the third network interface; and
in response to receiving the transmission request information from the second information processing terminal device via the third network interface,
issue the second authentication information,
transmit the second authentication information to the information processing terminal device via the third network interface, and
store, into the server-side storage, the first authentication information and the second authentication information in association with each other.

13. The communication system according to claim 12, wherein the third controller is further configured to transmit the acquisition instruction information to the image processing apparatus via the third network interface, the acquisition instruction information being for instructing the image processing apparatus to receive the first authentication information via the second near-field communication interface and to accept the second authentication information via the operation interface,
wherein the second controller is configured to:
enable the second near-field communication interface to receive the first authentication information from the first information processing terminal device, and enable the operation interface to accept the second authentication information;
in response to receiving the first authentication information from the first information processing terminal device via the second near-field communication interface, transmit the first authentication information to the server via the second communication interface; and
in response to accepting the second authentication information via the operation interface, transmit the second authentication information to the server via the second communication interface.

14. The communication system according to claim 11, wherein the third controller is configured to:
in response to receiving the second authentication information from the image processing apparatus via the second communication interface, transmit the first authentication information associated with the second authentication information, to the image processing apparatus via the third network interface; and
in response to receiving the first authentication information from the image processing apparatus via the third network interface, transmit the communication instruction information to the image processing apparatus via the third network interface,
wherein the image processing apparatus further comprises an apparatus-side storage, and
wherein the second controller is further configured to:
in response to receiving the first authentication information from the server via the second communication interface, store the first authentication information into the apparatus-side storage; and
transmit the first authentication information stored in the apparatus-side storage, to the server via the second communication interface.

15. The communication system according to claim 11, wherein the third controller is further configured to:
in response to receiving the second authentication information from the image processing apparatus via the third network interface, transmit the first authentication information associated with the received second authentication information, to the image processing apparatus via the third network interface; and
in response to receiving the first authentication information from the image processing apparatus via the third network interface, transmit the communication instruction information to the image processing apparatus via the third network interface, and wherein the second controller is further configured to:
in response to receiving the first authentication information from the server via the second communication interface, transmit the first authentication information to the information processing terminal device via the second near-field communication interface; and
transmit the first authentication information that is identical to the first authentication information transmitted to the information processing terminal device, to the server via the second communication interface.

16. The communication system according to claim 10, wherein the first authentication information comprises:
master authentication information; and
one-time authentication information that is updated each time the image processing apparatus performs data communication with the service providing apparatus, and
wherein the third controller is further configured to:
in response to receiving the master authentication information from the image processing apparatus via the third network interface, acquire the one-time authentication information from the service providing apparatus, using the master authentication information; and
transmit the communication instruction information including the acquired one-time authentication information, to the image processing apparatus via the third network interface.

17. The communication system according to claim 1, wherein the first network interface is configured to perform indirect communication with the server via a communication device and perform direct communication with the image processing apparatus without involving a communication device,
wherein the first controller is further configured to:
in response to accepting the instruction to perform the preparation process via the user interface, the transmit the transmission request information to the server via the indirect communication;
receive the authentication information from the server via the indirect communication; and
transmit the authentication information stored in the terminal-side storage, to the image processing apparatus via the direct communication,
wherein the second network interface is configured to perform the indirect communication and the direct communication, and
wherein the second controller is further configured to:
in response to accepting the instruction to perform data communication with the service providing apparatus, transmit the communication request information to the server via the indirect communication;
receive the acquisition instruction information from the server via the indirect communication;
in response to receiving the acquisition instruction information from the server via the indirect communication, set the second network interface into a receivable state where the second network interface is allowed to receive the authentication information from the information processing terminal device;
receive the authentication information from the information processing terminal device via the direct communication;
transmit the received authentication information to the server via the indirect communication;
receive communication instruction information from the server via the indirect communication, the communication instruction information indicating a method for data communication with the service providing apparatus; and
in response to receiving the communication instruction information from the server via the indirect communication, perform data communication with the service providing apparatus via the indirect communication in accordance with the received communication instruction information.

18. The communication system according to claim 1, wherein the first controller of the information processing terminal device is further configured to:
in response to accepting the instruction to perform the preparation process via the user interface, transmit the transmission request information to the server via the first network interface, the transmission request information being for requesting the server to transmit authentication information; and
receive the authentication information from the server via the first network interface, and
wherein the third controller of the server is further configured to, in response to receiving the transmission request information from the information processing terminal device via the third network interface, transmit the authentication information to the information processing terminal device via the third network interface.

19. The communication system according to claim 1, wherein the second controller of the image processing apparatus is further configured to, in response to receiving the acquisition instruction information from the server via the second network interface, set the second network interface into a receivable state where the second network interface is allowed to receive the authentication information from the information processing terminal device.

20. The communication system according to claim 1, wherein the third controller of the server is further configured to, in response to receiving the authentication information from the image processing apparatus via the third network interface, transmit communication instruction information to the image processing apparatus via the third network interface, the communication instruction information indicating a method for data communication with the service providing apparatus, and
wherein the second controller of the image processing apparatus is further configured to:
receive the communication instruction information from the server via the second network interface; and
in response to receiving the communication instruction information from the server via the second network interface, perform data communication with the service providing apparatus via the second network interface in accordance with the received communication instruction information.

* * * * *